US006427173B1

(12) United States Patent
Boucher et al.

(10) Patent No.: US 6,427,173 B1
(45) Date of Patent: *Jul. 30, 2002

(54) INTELLIGENT NETWORK INTERFACED DEVICE AND SYSTEM FOR ACCELERATED COMMUNICATION

(75) Inventors: Laurence B. Boucher, Saratoga; Stephen E. J. Blightman, San Jose; Peter K. Craft, San Francisco; David A. Higgen, Saratoga; Clive M. Philbrick, San Jose; Daryl D. Starr, Milpitas, all of CA (US)

(73) Assignee: Alacritech, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,283

(22) Filed: Dec. 15, 1999

Related U.S. Application Data

(63) Continuation-in-part of application No. 09/439,603, filed on Nov. 12, 1999, and a continuation-in-part of application No. 09/384,792, filed on Aug. 27, 1999, and a continuation of application No. 09/067,544, filed on Apr. 27, 1998, now Pat. No. 6,226,680

(60) Provisional application No. 60/061,809, filed on Oct. 14, 1997, and provisional application No. 60/098,296, filed on Aug. 27, 1998.

(51) Int. Cl.[7] .................. G06F 15/172; G06F 15/16
(52) U.S. Cl. .................. 709/238; 709/230; 709/250
(58) Field of Search ..................... 709/230, 238, 709/236, 228, 232, 250, 225

(56) References Cited

U.S. PATENT DOCUMENTS 4,366,538 A    12/1982   Johnson et al. ............. 264/200

(List continued on next page.)

FOREIGN PATENT DOCUMENTS

WO    WO98/19412    5/1998

(List continued on next page.)

OTHER PUBLICATIONS

Internet pages entitled: DART Fast Application—Level Networking Via Data—Copy Avoidance, by Robert J. Walsh, printed Jun. 3, 1999.

(List continued on next page.)

Primary Examiner—Zarni Maung
(74) Attorney, Agent, or Firm—T. Lester Wallace; Mark Lauer

(57) ABSTRACT

An intelligent network interface card (INIC) or communication processing device (CPD) works with a host computer for data communication. The device provides a fast-path that avoids protocol processing for most messages, greatly accelerating data transfer and offloading time-intensive processing tasks from the host CPU. The host retains a fallback processing capability for messages that do not fit fast-path criteria, with the device providing assistance such as validation even for slow-path messages, and messages being selected for either fast-path or slow-path processing. A context for a connection is defined that allows the device to move data, free of headers, directly to or from a destination or source in the host. The context can be passed back to the host for message processing by the host. The device contains specialized hardware circuits that are much faster at their specific tasks than a general purpose CPU. A preferred embodiment includes a trio of pipelined processors devoted to transmit, receive and utility processing, providing full duplex communication for four Fast Ethernet nodes. The device provides a fast-path that avoids protocol processing for most messages, greatly accelerating data transfer and offloading time-intensive processing tasks from the host CPU. The host retains a fallback processing capability for messages that do not fit fast-path criteria, with the device providing assistance such as validation even for slow-path messages, and messages being selected for either fast-path or slow-path processing. A context for a connection is defined that allows the device to move data, free of headers, directly to or from a destination or source in the host. The context can be passed back to the host for message processing by the host.

20 Claims, 21 Drawing Sheets

U.S. PATENT DOCUMENTS

| | | | |
|---|---|---|---|
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,548,730 A | 8/1996 | Young et al. | 395/280 |
| 5,566,170 A | 10/1996 | Bakke et al. | 370/60 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,629,933 A | 5/1997 | Delp et al. | 370/411 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,692,130 A | 11/1997 | Shobu et al. | 395/200.12 |
| 5,699,317 A | 12/1997 | Sartore et al. | 395/230.06 |
| 5,701,434 A | 12/1997 | Nakagawa | 395/484 |
| 5,701,516 A | 12/1997 | Cheng et al. | 395/842 |
| 5,749,095 A | 5/1998 | Hagersten | 711/141 |
| 5,751,715 A | 5/1998 | Chan et al. | 370/474 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,771,349 A | 6/1998 | Picazo, Jr. et al. | 395/188.01 |
| 5,790,804 A | 8/1998 | Osborne | 395/200.75 |
| 5,794,061 A | 8/1998 | Hansen et al. | 395/800.01 |
| 5,802,580 A | 9/1998 | McAlpice | 711/149 |
| 5,809,328 A | 9/1998 | Nogales et al. | 395/825 |
| 5,812,775 A | 9/1998 | Van Seters et al. | 395/200.43 |
| 5,815,464 A | 9/1998 | Purcell et al. | 395/163 |
| 5,878,228 A | 3/1999 | Bilansky et al. | 395/200.57 |
| 5,913,028 A | 6/1999 | Wang et al. | 395/200.33 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,991,599 A | 11/1999 | Radogna et al. | 370/392 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,026,452 A | 2/2000 | Pitts | 710/56 |
| 6,034,963 A | 3/2000 | Minami et al. | 370/401 |
| 6,044,438 A | 3/2000 | Olnowich | 711/130 |
| 6,047,356 A | 4/2000 | Anderson et al. | 711/129 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,141,705 A | 10/2000 | Anand et al. | 710/15 |
| 6,226,680 B1 * | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,334,153 B2 * | 12/2001 | Boucher et al. | 709/230 |

FOREIGN PATENT DOCUMENTS

| | | |
|---|---|---|
| WO | WO 00/13091 | 11/1998 |
| WO | WO98/50852 | 11/1998 |
| WO | PCT/US98/14729 | 1/1999 |
| WO | WO99/04343 | 1/1999 |
| WO | WO 99/65219 | 6/1999 |
| WO | WO 01/04770 A2 | 7/2000 |
| WO | WO 01/05107 A1 | 7/2000 |
| WO | WO 01/05116 A2 | 7/2000 |
| WO | WO /01/05123 A1 | 7/2000 |
| WO | WO 01/40960 A1 | 6/2001 |

OTHER PUBLICATIONS

Internet pages of InterProphet entitled: Frequently Asked Questions, by Lynne Jolitz, printed Jun. 14, 1999.

Internet pages entitled: Technical White Paper—Xpoint's Disk–to–LAN Acceleration Solution for Windows NT Server, printed Jun. 5, 1997.

Jato Technologies Internet pages entitled: Network Accelerator Chip Architecture, twelve–slide presentation, printed Aug. 19, 1998.

EETIMES article entitled: Enterprise System Uses Flexible Spec, by Christopher Harrer and Pauline Shulman, dated Aug. 10, 1998, Issue 1020, printed Nov. 25, 1998.

Internet pages entitled: iReady About Us and iReady Products, printed Nov. 25, 1998.

Internet pages entitled: Smart Ethernet Network Interface Car, which Berend Ozceri is developing, printed Nov. 25, 1998.

Internet pages entitled: Hardware Assisted Protocol Processing, which Eugene Feinberg is working on, printed Nov. 25, 1998.

Internet pages of XaQti Corporation entitled: Giga POWER Protocol Processor Product Preview, printed Nov. 25, 1998.

Internet pages of Xpoint Technologies www.xpoint.com web site (5 pages), printed Dec. 19, 1997.

Internet pages relating to iReady Corporation and the iReady Internet Tuner Module, printed Nov. 2, 1998.

Internet pages entitled: Asante and 100BASE–T Fast Ethernet, printed May 27, 1997.

Internet pages entitled: A Guide to the Paragon XP/S–A7 Supercomputer at Indiana University, printed Dec. 21, 1998.

Andrew S. Tanenbaum, Computer Networks, Third Edition, ISBN 0–13–349945–6 (1996).

Richard Stevens, "TCP/IP Illustrated, vol. 1, The Protocols", pp. 325–326 (1994).

VT8501 Apollo MVP4 Documentation, VIA Technologies, Inc., pp. i–iv, 1–11, cover and copyright page, revision 1.3 (Feb. 1, 2000).

Internet pages entitled: Northridge/Southridge vs. Intel Hub Architecture, 4 pages, printed Feb. 10, 2001.

Gigabit Ethernet Technical Brief, Achieving End–to–End Performance. Alteon Networks, Inc., First Edition, Sep. 1996.

Internet pages directed to; Technical Brief on Alteon Ethernet Gigabit NIC technology, www.alteon.com, 14 pages, printed Mar. 15, 1997.

Internet web pages from "Adaptec.com" website directed to the Adaptec, AEA–7110C iSCSI Host Bus Adapter and about Adaptec's IP storage activities, 11 pages, downloaded and printed Oct. 1, 2001.

Internet web pages from "iSCSIhba.com" website directed to JNI iSCSI HBAs including the "FCE–3210/6410", 10 pages, downloaded and printed Oct. 1, 2001.

Internet web pages from the "ISCSI Storage.com" website that mention an Emulex HBA, 2 pages, downloaded and printed Oct. 1, 2001.

Internet web pages from the "iSCSIhba.com" website that mention QLogic HBAs including the "SANblade 2300 Series", 8 pages, downloaded and printed Oct. 1, 2001.

"Two Way TCP Traffic over Rate Controlled Channels: Effects and Analysis", IEEE Transactions on Networking, vol. 6, No. 6, pp. 729–743 (Dec. 1998).

Internet pages from IReady News Archives entitled "iReady Rounding Out management team with two key executives," 2 pages, (printed Nov. 28, 1998).

Toshiba, "Toshiba Delivers First Chips to Make Consumer Devices Internet–Ready Based on iReady's Design", 3 pages, Press release Oct. 14, 1998, downloaded Nov. 28, 1998.

Internet pages entitled "iReady Products" from website http://www.ireadyco.com/products.html, 2 pages, printed Nov. 25, 1998.

Iready News Archives. Toshiba, iReady shipping Internet Chip, 1 page printed Nov. 28, 1998.

Internet site www.interprophet.com, 17 pages, printed Mar. 1, 2000.

The I–1000 Internet Tuner Features, iReady Corporation, 2 pages, date unknown.

Internet pages from website http://www.ireadyco.com/about.html, 3 pages, downloaded Nov. 25, 1998.

IReady News Archives, "Revolutionary Approach to Consumer Electronics Internet Connectivity Funded", San Jose, CA. 2 pages, Nov. 20, 1997, downloaded and printed Nov. 2, 1998.

IReady News Archives, "Seiko Instruments Inc. (SII) Introduces World's First Internet–Ready Intelligent LCD Modules Based on IReady Technology", 2 pages Oct. 26, 1998, downloaded and printed Nov. 2, 1998.

NEWSwatch—IReady Internet Tuner to Web Enable Devices, Nov. 5, 1996. 2 pages, printed Nov. 2, 1998.

David Lammers, EETimes, Jun. 13, 1997, "Tuner for Toshiba, Toshiba taps iReady for Internet tuner," 2 pages, printed Nov. 2, 1998.

Internet pages entitled: Comparison of Novell Netware and TCP/IP Protocol Architectures, by Janique S. Carbone, 19 pages, Jul. 16, 1995, downloaded and printed Apr. 10, 1998.

60/053,240 (U.S. Provisional Application), by Jolitz et al. (listed filing date Jul. 18, 1997).

Zilog Product Brief entitled "Z85C30 CMOS SCC Serial Communication Controller", Zilog Inc., 3 pages (1997).

U.S. application No. 08/964,304, by Napolitano, et al., entitled "File Array Storage Architecture", filed Nov. 4, 1997.

Article by D. Hitz, et al., "File System Design For An NFS File Server Appliance", 13 pages, 1996.

Adaptec Press Release, "Adaptec Announces EtherStorage Technology", 2 pages, May 4, 2000, printed Jun. 14, 2000.

Adaptec article, "EtherStorage Frequently Asked Questions," 5 pages, printed Jul. 19, 2000.

Adaptec article, "EtherStorage White Paper," 7 pages, printed Jul. 19, 2000.

CIBC World Markets article by J. Berlino et al., "Computers; Storage", 9 pages, dated Aug. 7, 2000.

Merrill Lynch article by S. Milunovich, "Storage Futures", 22 pages, dated May 10, 2000.

Internet–draft of J. Satran, et al., "SCSI/TCP (SCSI over TCP)", 38 pages, dated Feb. 2000.

Article by S. Taylor, "Montreal Start–Up Battles Data Storage Botttleneck," 2 pages, dated Mar. 5, 2000.

* cited by examiner

INTELLIGENT NETWORK INTERFACED DEVICE AND SYSTEM FOR ACCELERATED COMMUNICATION

CROSS-REFERENCE TO RELATED APPLICATIONS

This application C-I-P under 35 U.S.C. §120 of U.S. patent application Ser. No. 09/439,603, entitled "INTELLIGENT NETWORK INTERFACE SYSTEM AND METHOD FOR ACCELERATED PROTOCOL PROCESSING", filed Nov. 12, 1999, by Laurence B. Boucher et al., which in turn claims the benefit under 35 U.S.C. §119(e)(1) of the Provisional Application filed under 35 U.S.C. §111(b) entitled "INTELLIGENT NETWORK INTERFACE CARD AND SYSTEM FOR PROTOCOL PROCESSING," Serial No. 60/061,809, filed on Oct. 14, 1997.

This application also C-I-P under 35 U.S.C. §120 of U.S. patent application Ser. No. 09/384,792, entitled "INTELLIGENT NETWORK INTERFACE DEVICE AND SYSTEM FOR ACCELERATED COMMUNICATION," filed Aug. 27, 1999, which in turn claims the benefit under 35 U.S.C. §119(e)(1) of the Provisional Application filed under 35 U.S.C. §111(b) entitled "INTELLIGENT NETWORK INTERFACE DEVICE AND SYSTEM FOR ACCELERATED COMMUNICATION," Serial No. 60/098,296, filed Aug. 27, 1998. This application is also a continuation of application Ser. No. 09/067,544, filed Apr. 27, 1998, now U.S. Pat. No. 6,226,680. The subject matter of all three of the above-identified patent applications, and of the two above-identified provisional applications, is incorporated by reference herein.

REFERENCE TO MICROFICHE APPENDIX

The Microfiche Appendix, which is a part of the present disclosure, includes Microfiche Appendix A, Microfiche Appendix B, and Microfiche Appendix C. Microfiche Appendix A entails one sheet of microfiche having a total of 22 frames; Microfiche Appendix B entails one sheet of microfiche having a total of 92 frames; Microfiche Appendix C entails seven sheets of microfiche having a total of 594 frames.

Microfiche Appendix A contains a hardware description language (verilog code) description of an embodiment of a receive sequencer. Microfiche Appendix B contains microcode executed by a processor that operates in conjunction with the receive sequencer of Microfiche Appendix A. Microfiche Appendix B also includes a description of the instruction set of the processor. Microfiche Appendix C contains a device driver executable on the host as well as ATCP code executable on the host. A portion of the disclosure of this patent document contains material (other than any portion of the "free BSD" stack included in Microfiche Appendix C) which is subject to copyright protection. The copyright owner of that material has no objection to the facsimile reproduction by anyone of the patent document or the patent disclosure, as it appears in the Patent and Trademark Office patent files or records, but otherwise reserves all copyright rights.

TECHNICAL FIELD

The present invention relates generally to computer or other networks, and more particularly to processing of information communicated between hosts such as computers connected to a network.

BACKGROUND

The advantages of network computing are increasingly evident. The convenience and efficiency of providing information, communication or computational power to individuals at their personal computer or other end user devices has led to rapid growth of such network computing, including internet as well as intranet devices and applications.

As is well known, most network computer communication is accomplished with the aid of a layered software architecture for moving information between host computers connected to the network. The layers help to segregate information into manageable segments, the general functions of each layer often based on an international standard called Open Systems Interconnection (OSI). OSI sets forth seven processing layers through which information may pass when received by a host in order to be presentable to an end user. Similarly, transmission of information from a host to the network may pass through those seven processing layers in reverse order. Each step of processing and service by a layer may include copying the processed information. Another reference model that is widely implemented, called TCP/IP (TCP stands for transport control protocol, while IP denotes internet protocol) essentially employs five of the seven layers of OSI.

Networks may include, for instance, a high-speed bus such as an Ethernet connection or an internet connection between disparate local area networks (LANs), each of which includes multiple hosts, or any of a variety of other known means for data transfer between hosts. According to the OSI standard, physical layers are connected to the network at respective hosts, the physical layers providing transmission and receipt of raw data bits via the network. A data link layer is serviced by the physical layer of each host, the data link layers providing frame division and error correction to the data received from the physical layers, as well as processing acknowledgment frames sent by the receiving host. A network layer of each host is serviced by respective data link layers, the network layers primarily controlling size and coordination of subnets of packets of data.

A transport layer is serviced by each network layer and a session layer is serviced by each transport layer within each host. Transport layers accept data from their respective session layers and split the data into smaller units for transmission to the other host's transport layer, which concatenates the data for presentation to respective presentation layers. Session layers allow for enhanced communication control between the hosts. Presentation layers are serviced by their respective session layers, the presentation layers translating between data semantics and syntax which may be peculiar to each host and standardized structures of data representation. Compression and/or encryption of data may also be accomplished at the presentation level. Application layers are serviced by respective presentation layers, the application layers translating between programs particular to individual hosts and standardized programs for presentation to either an application or an end user. The TCP/IP standard includes the lower four layers and application layers, but integrates the functions of session layers and presentation layers into adjacent layers. Generally speaking, application, presentation and session layers are defined as upper layers, while transport, network and data link layers are defined as lower layers.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, devices and programs commonly employed, each layer is necessary to insure that the data can make it to the intended destination in the appropriate form, regardless of variations in hardware and software that may intervene.

In preparing data for transmission from a first to a second host, some control data is added at each layer of the first host regarding the protocol of that layer, the control data being indistinguishable from the original (payload) data for all lower layers of that host. Thus an application layer attaches an application header to the payload data and sends the combined data to the presentation layer of the sending host, which receives the combined data, operates on it and adds a presentation header to the data, resulting in another combined data packet. The data resulting from combination of payload data, application header and presentation header is then passed to the session layer, which performs required operations including attaching a session header to the data and presenting the resulting combination of data to the transport layer. This process continues as the information moves to lower layers, with a transport header, network header and data link header and trailer attached to the data at each of those layers, with each step typically including data moving and copying, before sending the data as bit packets over the network to the second host.

The receiving host generally performs the converse of the above-described process, beginning with receiving the bits from the network, as headers are removed and data processed in order from the lowest (physical) layer to the highest (application) layer before transmission to a destination of the receiving host. Each layer of the receiving host recognizes and manipulates only the headers associated with that layer, since to that layer the higher layer control data is included with and indistinguishable from the payload data. Multiple interrupts, valuable central processing unit (CPU) processing time and repeated data copies may also be necessary for the receiving host to place the data in an appropriate form at its intended destination.

The above description of layered protocol processing is simplified, as college-level textbooks devoted primarily to this subject are available, such as Computer Networks, Third Edition (1996) by Andrew S. Tanenbaum, which is incorporated herein by reference. As defined in that book, a computer network is an interconnected collection of autonomous computers, such as internet and intranet devices, including local area networks (LANs), wide area networks (WANs), asynchronous transfer mode (ATM), ring or token ring, wired, wireless, satellite or other means for providing communication capability between separate processors. A computer is defined herein to include a device having both logic and memory functions for processing data, while computers or hosts connected to a network are said to be heterogeneous if they function according to different operating devices or communicate via different architectures.

As networks grow increasingly popular and the information communicated thereby becomes increasingly complex and copious, the need for such protocol processing has increased. It is estimated that a large fraction of the processing power of a host CPU may be devoted to controlling protocol processes, diminishing the ability of that CPU to perform other tasks. Network interface cards have been developed to help with the lowest layers, such as the physical and data link layers. It is also possible to increase protocol processing speed by simply adding more processing power or CPUs according to conventional arrangements. This solution, however, is both awkward and expensive. But the complexities presented by various networks, protocols, architectures, operating devices and applications generally require extensive processing to afford communication capability between various network hosts.

SUMMARY OF THE INVENTION

The current invention provides a device for processing network communication that greatly increases the speed of that processing and the efficiency of transferring data being communicated. The invention has been achieved by questioning the long-standing practice of performing multilayered protocol processing on a general-purpose processor. The protocol processing method and architecture that results effectively collapses the layers of a connection-based, layered architecture such as TCP/IP into a single wider layer which is able to send network data more directly to and from a desired location or buffer on a host. This accelerated processing is provided to a host for both transmitting and receiving data, and so improves performance whether one or both hosts involved in an exchange of information have such a feature.

The accelerated processing includes employing representative control instructions for a given message that allow data from the message to be processed via a fast-path which accesses message data directly at its source or delivers it directly to its intended destination. This fast-path bypasses conventional protocol processing of headers that accompany the data. The fast-path employs a specialized microprocessor designed for processing network communication, avoiding the delays and pitfalls of conventional software layer processing, such as repeated copying and interrupts to the CPU. In effect, the fast-path replaces the states that are traditionally found in several layers of a conventional network stack with a single state machine encompassing all those layers, in contrast to conventional rules that require rigorous differentiation and separation of protocol layers. The host retains a sequential protocol processing stack which can be employed for setting up a fast-path connection or processing message exceptions. The specialized microprocessor and the host intelligently choose whether a given message or portion of a message is processed by the microprocessor or the host stack.

Other structures and methods are disclosed in the detailed description below. This summary does not purport to define the invention. The invention is defined by the claims.

DETAILED DESCRIPTION

Figure 1:
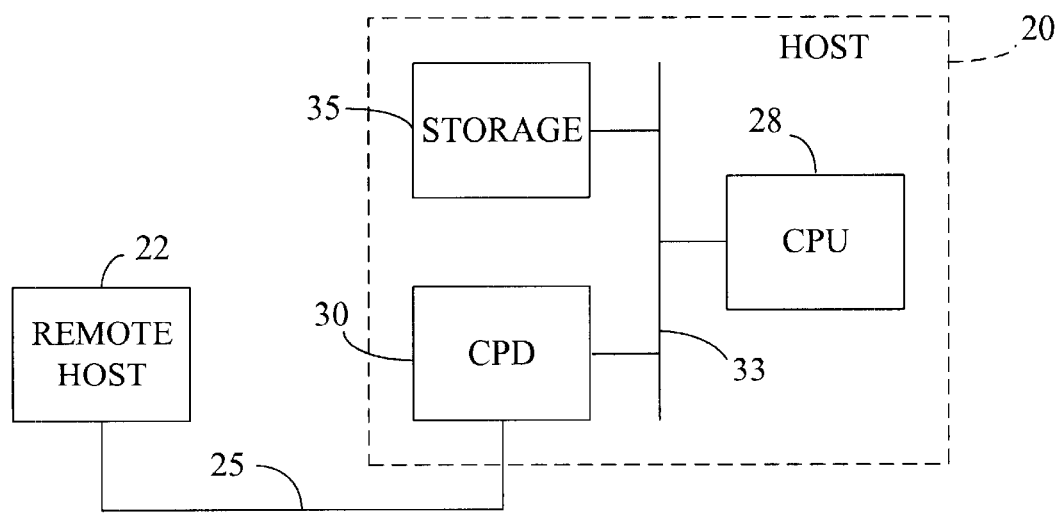
FIG. 1 is a plan view diagram of a device of the present invention, including a host computer having a communication-processing device for accelerating network communication.

FIG. 1 shows a host 20 of the present invention connected by a network 25 to a remote host 22. The increase in processing speed achieved by the present invention can be provided with an intelligent network interface card (INIC) that is easily and affordably added to an existing host, or with a communication processing device (CPD) that is integrated into a host, in either case freeing the host CPU from most protocol processing and allowing improvements in other tasks performed by that CPU. The host 20 in a first embodiment contains a CPU 28 and a CPD 30 connected by a PCI bus 33. The CPD 30 includes a microprocessor designed for processing communication data and memory buffers controlled by a direct memory access (DMA) unit. Also connected to the PCI bus 33 is a storage device 35, such as a semiconductor memory or disk drive, along with any related controls.

Figure 2:
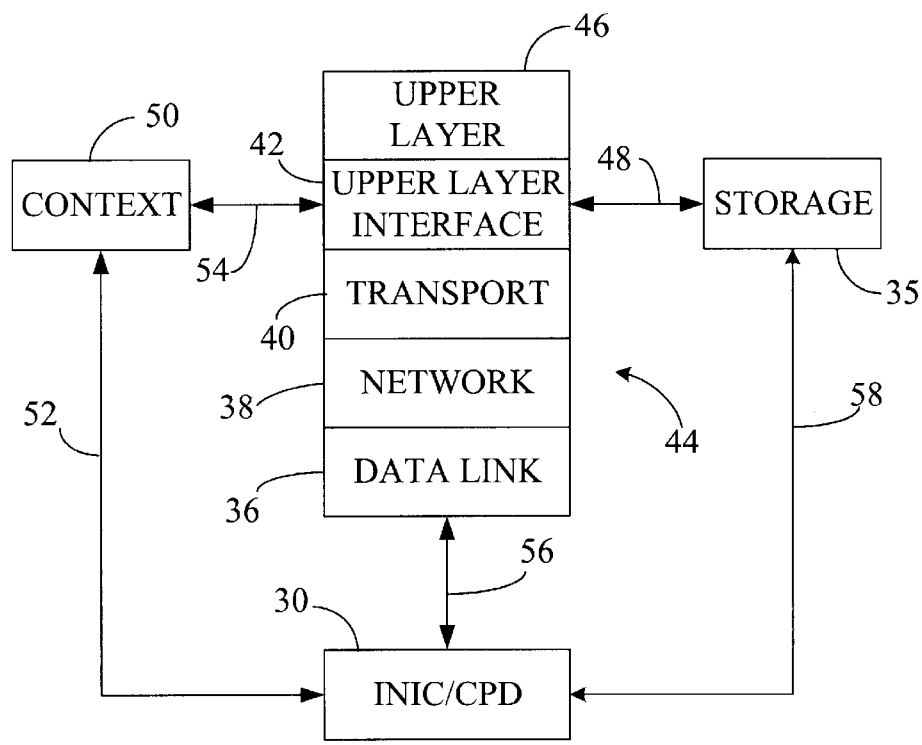
FIG. 2 is a diagram of information flow for the host of FIG. 1 in processing network communication, including a fast-path, a slow-path and a transfer of connection context between the fast and slow-paths.

Referring additionally to FIG. 2, the host CPU 28 controls a protocol processing stack 44 housed in storage 35, the stack including a data link layer 36, network layer 38, transport layer 40, upper layer 46 and an upper layer interface 42. The upper layer 46 may represent a session, presentation and/or application layer, depending upon the particular protocol being employed and message communicated. The upper layer interface 42, along with the CPU 28 and any related controls can send or retrieve a file to or from the upper layer 46 or storage 35, as shown by arrow 48. A connection context 50 has been created, as will be explained below, the context summarizing various features of the connection, such as protocol type and source and destination addresses for each protocol layer. The context may be passed between an interface for the session layer 42 and the CPD 30, as shown by arrows 52 and 54, and stored as a communication control block (CCB) at either CPD 30 or storage 35.

When the CPD 30 holds a CCB defining a particular connection, data received by the CPD from the network and pertaining to the connection is referenced to that CCB and can then be sent directly to storage 35 according to a fast-path 58, bypassing sequential protocol processing by the data link 36, network 38 and transport 40 layers. Transmitting a message, such as sending a file from storage 35 to remote host 22, can also occur via the fast-path 58, in which case the context for the file data is added by the CPD 30 referencing a CCB, rather than by sequentially adding headers during processing by the transport 40, network 38 and data link 36 layers. The DMA controllers of the CPD 30 perform these transfers between CPD and storage 35.

The CPD 30 collapses multiple protocol stacks each having possible separate states into a single state machine for fast-path processing. As a result, exception conditions may occur that are not provided for in the single state machine, primarily because such conditions occur infrequently and to deal with them on the CPD would provide little or no performance benefit to the host. Such exceptions can be CPD 30 or CPU 28 initiated. An advantage of the invention includes the manner in which unexpected situations that occur on a fast-path CCB are handled. The CPD 30 deals with these rare situations by passing back or flushing to the host protocol stack 44 the CCB and any associated message frames involved, via a control negotiation. The exception condition is then processed in a conventional manner by the host protocol stack 44. At some later time, usually directly after the handling of the exception condition has completed and fast-path processing can resume, the host stack 44 hands the CCB back to the CPD.

This fallback capability enables the performance-impacting functions of the host protocols to be handled by the CPD network microprocessor, while the exceptions are dealt with by the host stacks, the exceptions being so rare as to negligibly effect overall performance. The custom designed network microprocessor can have independent processors for transmitting and receiving network information, and further processors for assisting and queuing. A preferred microprocessor embodiment includes a pipelined trio of receive, transmit and utility processors. DMA controllers are integrated into the implementation and work in close concert with the network microprocessor to quickly move data between buffers adjacent to the controllers and other locations such as long term storage. Providing buffers logically adjacent to the DMA controllers avoids unnecessary loads on the PCI bus.

Figure 3:
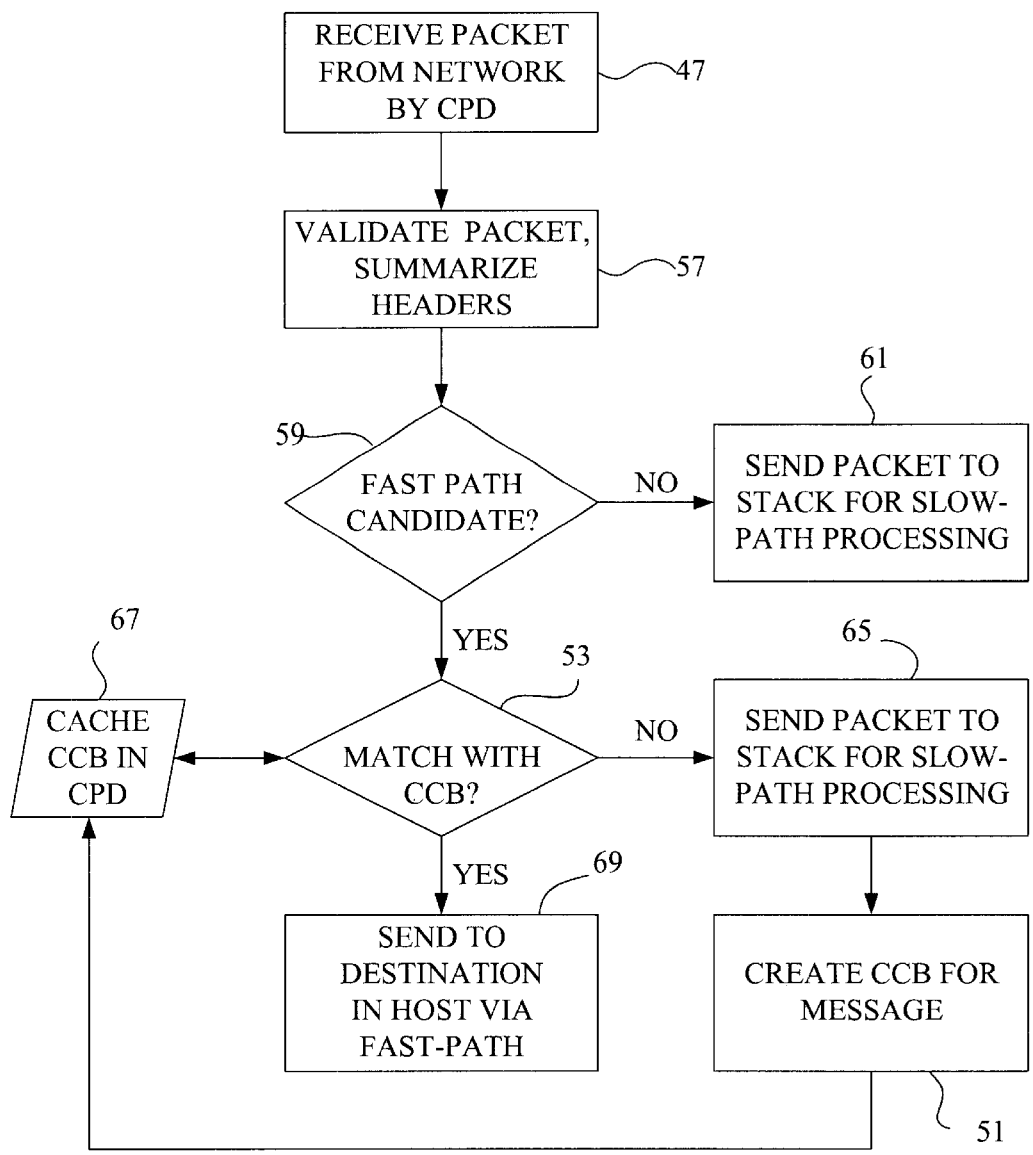
FIG. 3 is a flow chart of message receiving according to the present invention.

FIG. 3 diagrams the general flow of messages received according to the current invention. A large TCP/IP message such as a file transfer may be received by the host from the network in a number of separate, approximately 64 KB transfers, each of which may be split into many, approximately 1.5 KB frames or packets for transmission over a network. Novell NetWare protocol suites running Sequenced Packet Exchange Protocol (SPX) or NetWare Core Protocol (NCP) over Internetwork Packet Exchange (IPX) work in a similar fashion. Another form of data communication which can be handled by the fast-path is Transaction TCP (hereinafter T/TCP or TTCP), a version of TCP which initiates a connection with an initial transaction request after which a reply containing data may be sent according to the connection, rather than initiating a connection via a several-message initialization dialogue and then transferring data with later messages. In any of the transfers typified by these protocols, each packet conventionally includes a portion of the data being transferred, as well as headers for each of the protocol layers and markers for positioning the packet relative to the rest of the packets of this message.

When a message packet or frame is received 47 from a network by the CPD, it is first validated by a hardware assist. This includes determining the protocol types of the various layers, verifying relevant checksums, and summarizing 57 these findings into a status word or words. Included in these words is an indication whether or not the frame is a candidate for fast-path data flow. Selection 59 of fast-path candidates is based on whether the host may benefit from this message connection being handled by the CPD, which includes determining whether the packet has header bytes indicating particular protocols, such as TCP/IP or SPX/IPX for example. The small percent of frames that are not fast-path candidates are sent 61 to the host protocol stacks for slow-path protocol processing. Subsequent network microprocessor work with each fast-path candidate determines whether a fast-path connection such as a TCP or SPX CCB is already extant for that candidate, or whether that candidate may be used to set up a new fast-path connection, such as for a TTCP/IP transaction. The validation provided by the CPD provides acceleration whether a frame is processed by the fast-path or a slow-path, as only error free, validated frames are processed by the host CPU even for the slow-path processing.

All received message frames which have been determined by the CPD hardware assist to be fast-path candidates are examined 53 by the network microprocessor or INIC comparator circuits to determine whether they match a CCB held by the CPD. Upon confirming such a match, the CPD removes lower layer headers and sends 69 the remaining application data from the frame directly into its final destination in the host using direct memory access (DMA) units of the CPD. This operation may occur immediately upon receipt of a message packet, for example when a TCP connection already exists and destination buffers have been negotiated, or it may first be necessary to process an initial header to acquire a new set of final destination addresses for this transfer. In this latter case, the CPD will queue subsequent message packets while waiting for the destination address, and then DMA the queued application data to that destination.

A fast-path candidate that does not match a CCB may be used to set up a new fast-path connection, by sending 65 the frame to the host for sequential protocol processing. In this case, the host uses this frame to create 51 a CCB, which is then passed to the CPD to control subsequent frames on that connection. The CCB, which is cached 67 in the CPD, includes control and state information pertinent to all protocols that would have been processed had conventional software layer processing been employed. The CCB also contains storage space for per-transfer information used to facilitate moving application-level data contained within subsequent related message packets directly to a host application in a form available for immediate usage. The CPD takes command of connection processing upon receiving a CCB for that connection from the host.

Figure 4A:
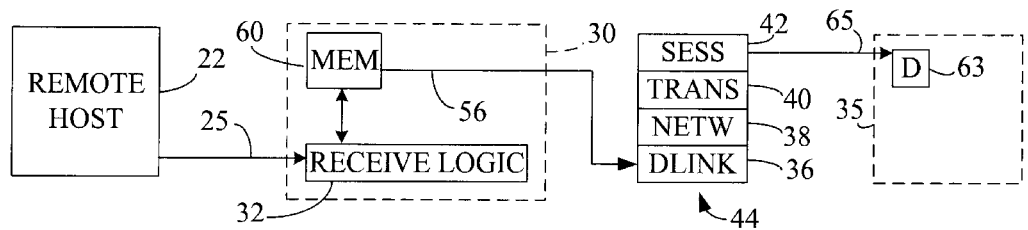
FIG. 4A is a diagram of information flow for the host of FIG. 1 receiving a message packet processed by the slow-path.

As shown more specifically in FIG. 4A, when a message packet is received from the remote host 22 via network 25, the packet enters hardware receive logic 32 of the CPD 30, which checksums headers and data, and parses the headers, creating a word or words which identify the message packet and status, storing the headers, data and word temporarily in memory 60. As well as validating the packet, the receive logic 32 indicates with the word whether this packet is a candidate for fast-path processing. FIG. 4A depicts the case in which the packet is not a fast-path candidate, in which case the CPD 30 sends the validated headers and data from memory 60 to data link layer 36 along an internal bus for processing by the host CPU, as shown by arrow 56. The packet is processed by the host protocol stack 44 of data link 36, network 38, transport 40 and session 42 layers, and data (D) 63 from the packet may then be sent to storage 35, as shown by arrow 65.

Figure 4B:
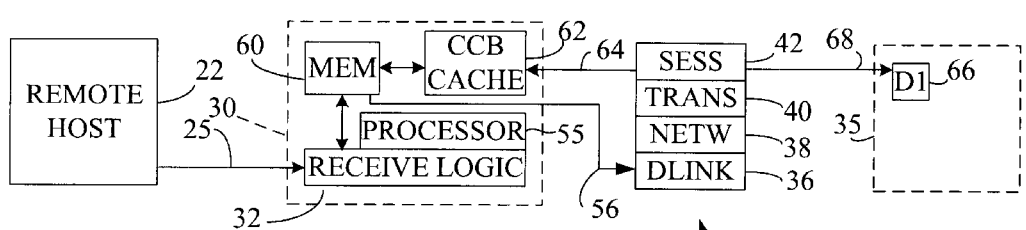
FIG. 4B is a diagram of information flow for the host of FIG. 1 receiving an initial message packet processed by the fast-path.

FIG. 4B, depicts the case in which the receive logic 32 of the CPD determines that a message packet is a candidate for fast-path processing, for example by deriving from the packet's headers that the packet belongs to a TCP/IP, TTCP/IP or SPX/IPX message. A processor 55 in the CPD 30 then checks to see whether the word that summarizes the fast-path candidate matches a CCB held in a cache 62. Upon finding no match for this packet, the CPD sends the validated packet from memory 60 to the host protocol stack 44 for processing. Host stack 44 may use this packet to create a connection context for the message, including finding and reserving a destination for data from the message associated with the packet, the context taking the form of a CCB. The present embodiment employs a single specialized host stack 44 for processing both fast-path and non-fast-path candidates, while in an embodiment described below fast-path candidates are processed by a different host stack than non-fast-path candidates. Some data (D1) 66 from that initial packet may optionally be sent to the destination in storage 35, as shown by arrow 68. The CCB is then sent to the CPD 30 to be saved in cache 62, as shown by arrow 64. For a traditional connection-based message such as typified by TCP/IP, the initial packet may be part of a connection initialization dialogue that transpires between hosts before the CCB is created and passed to the CPD 30.

Figure 4C:
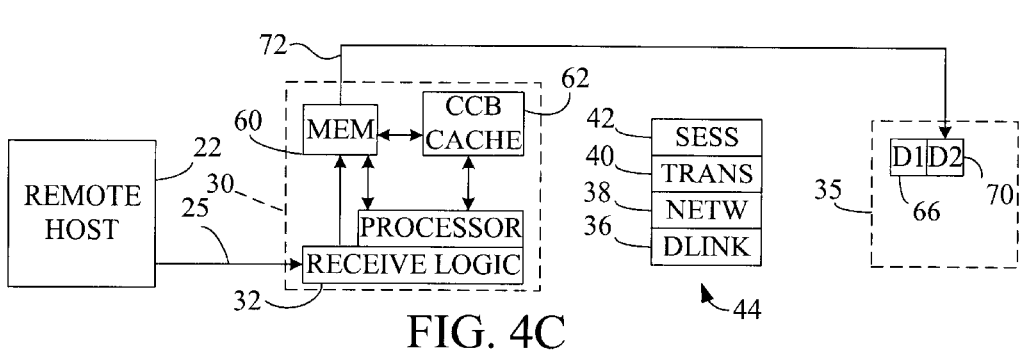
FIG. 4C is a diagram of information flow for the host of FIG. 4B receiving a subsequent message packet processed by the fast-path.

Referring now to FIG. 4C, when a subsequent packet from the same connection as the initial packet is received from the network 25 by CPD 30, the packet headers and data are validated by the receive logic 32, and the headers are parsed to create a summary of the message packet and a hash for finding a corresponding CCB, the summary and hash contained in a word or words. The word or words are temporarily stored in memory 60 along with the packet. The processor 55 checks for a match between the hash and each CCB that is stored in the cache 62 and, finding a match, sends the data (D2) 70 via a fast-path directly to the destination in storage 35, as shown by arrow 72, bypassing the session layer 42, transport layer 40, network layer 38 and data link layer 36. The remaining data packets from the message can also be sent by DMA directly to storage, avoiding the relatively slow protocol layer processing and repeated copying by the CPU stack 44.

Figure 4D:
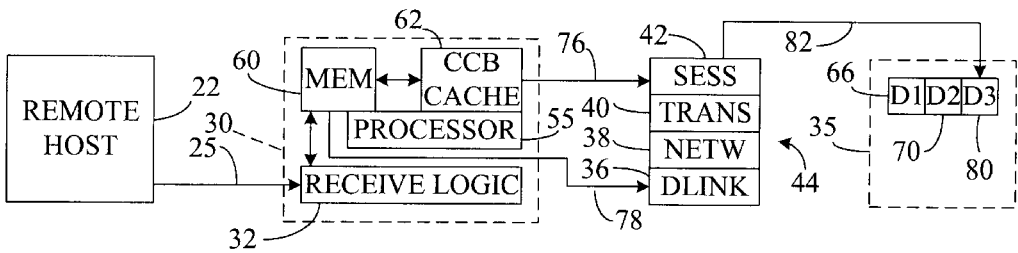
FIG. 4D is a diagram of information flow for the host of FIG. 4C receiving a message packet having an error that causes processing to revert to the slow-path.
Figure 5:
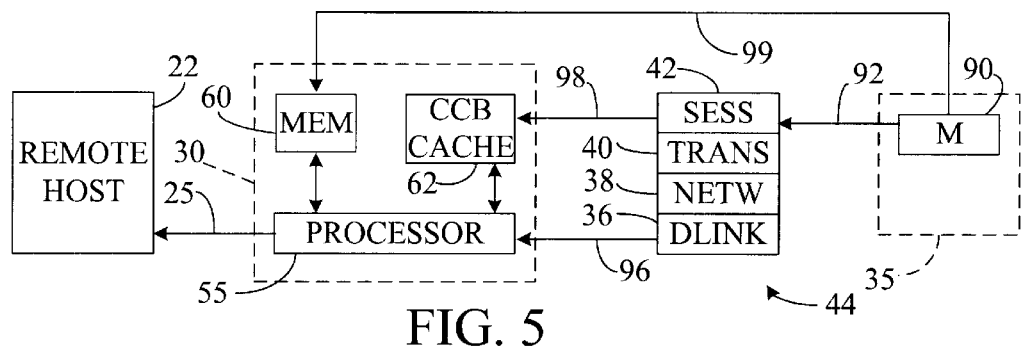
FIG. 5 is a diagram of information flow for the host of FIG. 1 transmitting a message by either the fast or slow-paths.

FIG. 4D shows the procedure for handling the rare instance when a message for which a fast-path connection has been established, such as shown in FIG. 4C, has a packet that is not easily handled by the CPD. In this case the packet is sent to be processed by the protocol stack 44, which is handed the CCB for that message from cache 62 via a control dialogue with the CPD, as shown by arrow 76, signaling to the CPU to take over processing of that message. Slow-path processing by the protocol stack then results in data (D3) 80 from the packet being sent, as shown by arrow 82, to storage 35. Once the packet has been processed and the error situation corrected, the CCB can be handed back via a control dialogue to the cache 62, so that payload data from subsequent packets of that message can again be sent via the fast-path of the CPD 30. Thus the CPU and CPD together decide whether a given message is to be processed according to fast-path hardware processing or more conventional software processing by the CPU. Transmission of a message from the host 20 to the network 25 for delivery to remote host 22 also can be processed by either sequential protocol software processing via the CPU or accelerated hardware processing via the CPD 30, as shown in FIG. 5. A message (M) 90 that is selected by CPU 28 from storage 35 can be sent to session layer 42 for processing by stack 44, as shown by arrows 92 and 96. For the situation in which a connection exists and the CPD 30 already has an appropriate CCB for the message, however, data packets can bypass host stack 44 and be sent by DMA directly to memory 60, with the processor 55 adding to each data packet a single header containing all the appropriate protocol layers, and sending the resulting packets to the network 25 for transmission to remote host 22. This fast-path transmission can greatly accelerate processing for even a single packet, with the acceleration multiplied for a larger message.

A message for which a fast-path connection is not extant thus may benefit from creation of a CCB with appropriate control and state information for guiding fast-path transmission. For a traditional connection-based message, such as typified by TCP/IP or SPX/IPX, the CCB is created during connection initialization dialogue. For a quick-connection message, such as typified by TTCP/IP, the CCB can be created with the same transaction that transmits payload data. In this case, the transmission of payload data may be a reply to a request that was used to set up the fast-path connection. In any case, the CCB provides protocol and status information regarding each of the protocol layers, including which user is involved and storage space for per-transfer information. The CCB is created by protocol stack 44, which then passes the CCB to the CPD 30 by writing to a command register of the CPD, as shown by arrow 98. Guided by the CCB, the processor 55 moves network frame-sized portions of the data from the source in host memory 35 into its own memory 60 using DMA, as depicted by arrow 99. The processor 55 then prepends appropriate headers and checksums to the data portions, and transmits the resulting frames to the network 25, consistent with the restrictions of the associated protocols. After the CPD 30 has received an acknowledgement that all the data has reached its destination, the CPD will then notify the host 35 by writing to a response buffer. Thus, fast-path transmission of data communications also relieves the host CPU of per-frame processing. A vast majority of data transmissions can be sent to the network by the fast-path. Both the input and output fast-paths attain a huge reduction in interrupts by functioning at an upper layer level, i.e., session level or higher, and interactions between the network microprocessor and the host occur using the full transfer sizes which that upper layer wishes to make. For fast-path communications, an interrupt only occurs (at the most) at the beginning and end of an entire upper-layer message transaction, and there are no interrupts for the sending or receiving of each lower layer portion or packet of that transaction.

Figure 6:
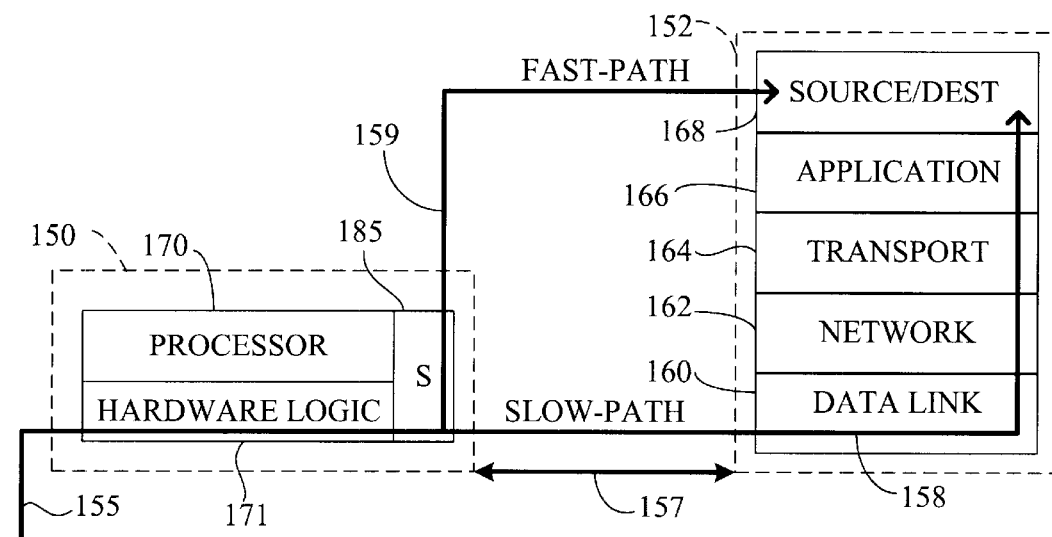
FIG. 6 is a diagram of information flow for a first embodiment of an intelligent network interface card (INIC) associated with a client having a TCP/IP processing stack.

A simplified intelligent network interface card (INIC) 150 is shown in FIG. 6 to provide a network interface for a host 152. Hardware logic 171 of the INIC 150 is connected to a network 155, with a peripheral bus (PCI) 157 connecting the INIC and host. The host 152 in this embodiment has a TCP/IP protocol stack, which provides a slow-path 158 for sequential software processing of message frames received from the network 155. The host 152 protocol stack includes a data link layer 160, network layer 162, a transport layer 164 and an application layer 166, which provides a source or destination 168 for the communication data in the host 152. Other layers which are not shown, such as session and presentation layers, may also be included in the host stack 152, and the source or destination may vary depending upon the nature of the data and may actually be the application layer.

The INIC 150 has a network processor 170 which chooses between processing messages along a slow-path 158 that includes the protocol stack of the host, or along a fast-path 159 that bypasses the protocol stack of the host. Each received packet is processed on the fly by hardware logic 171 contained in NIC 150, so that all of the protocol headers for a packet can be processed without copying, moving or storing the data between protocol layers. The hardware logic 171 processes the headers of a given packet at one time as packet bytes pass through the hardware, by categorizing selected header bytes. Results of processing the selected bytes help to determine which other bytes of the packet are categorized, until a summary of the packet has been created, including checksum validations. The processed headers and data from the received packet are then stored in INIC storage 185, as well as the word or words summarizing the headers and status of the packet. For a network storage configuration, the INIC 150 may be connected to a peripheral storage device such as a disk drive which has an IDE, SCSI or similar interface, with a file cache for the storage device residing on the memory 185 of the INIC 150. Several such network interfaces may exist for a host, with each interface having an associated storage device.

Figure 7:
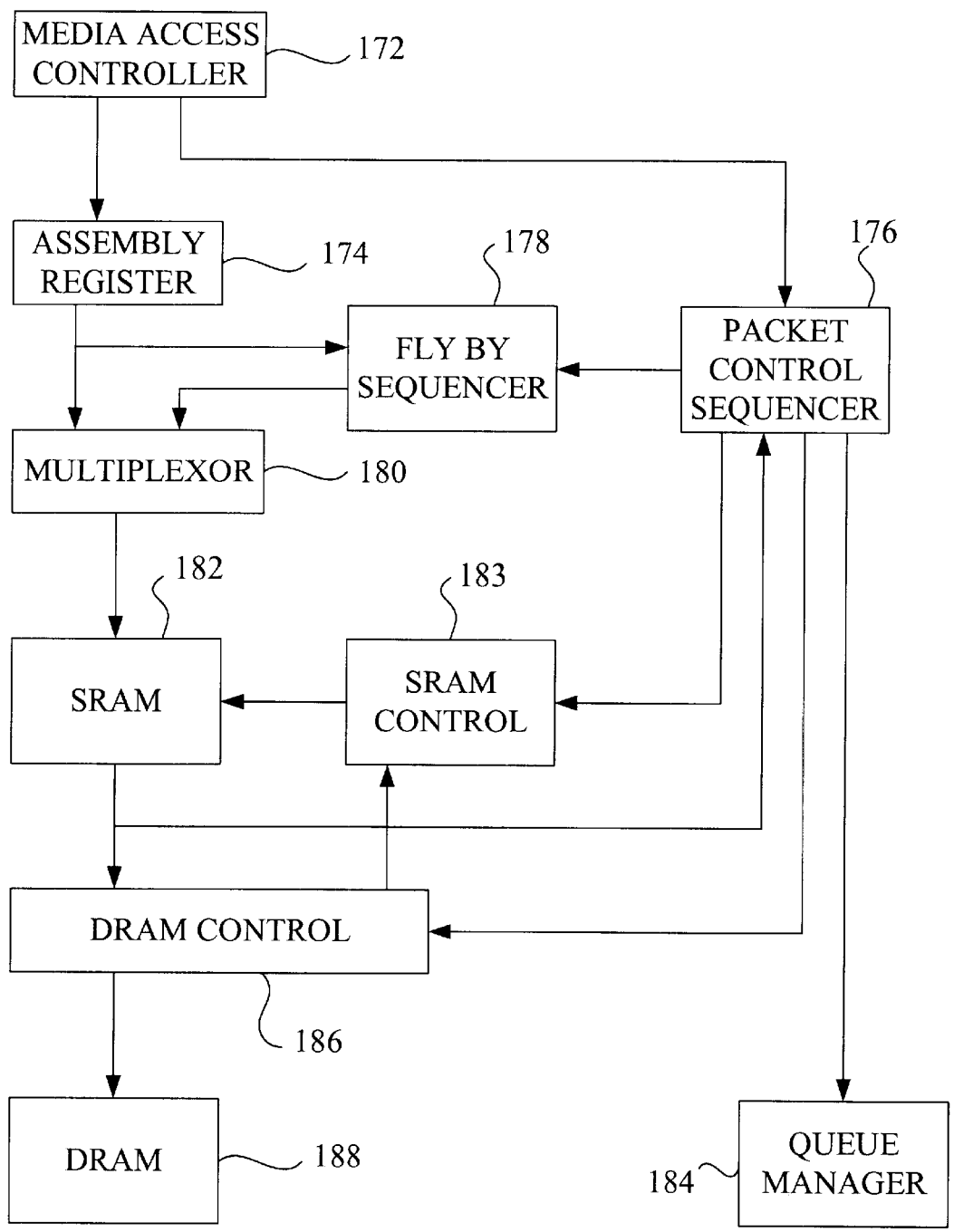
FIG. 7 is a diagram of hardware logic for the INIC embodiment shown in FIG. 6, including a packet control sequencer and a fly-by sequencer.

The hardware processing of message packets received by INIC 150 from network 155 is shown in more detail in FIG. 7. A received message packet first enters a media access controller 172, which controls INIC access to the network and receipt of packets and can provide statistical information for network protocol management. From there, data flows one byte at a time into an assembly register 174, which in this example is 128 bits wide. The data is categorized by a fly-by sequencer 178, as will be explained in more detail with regard to FIG. 8, which examines the bytes of a packet as they fly by, and generates status from those bytes that will be used to summarize the packet. The status thus created is merged with the data by a multiplexor 180 and the resulting data stored in SRAM 182. A packet control sequencer 176 oversees the fly-by sequencer 178, examines information from the media access controller 172, counts the bytes of data, generates addresses, moves status and manages the movement of data from the assembly register 174 to SRAM 182 and eventually DRAM 188. The packet control sequencer 176 manages a buffer in SRAM 182 via SRAM controller 183, and also indicates to a DRAM controller 186 when data needs to be moved from SRAM 182 to a buffer in DRAM 188. Once data movement for the packet has been completed and all the data has been moved to the buffer in DRAM 188, the packet control sequencer 176 will move the status that has been generated in the fly-by sequencer 178 out to the SRAM 182 and to the beginning of the DRAM 188 buffer to be prepended to the packet data. The packet control sequencer 176 then requests a queue manager 184 to enter a receive buffer descriptor into a receive queue, which in turn notifies the processor 170 that the packet has been processed by hardware logic 171 and its status summarized.

Figure 8:
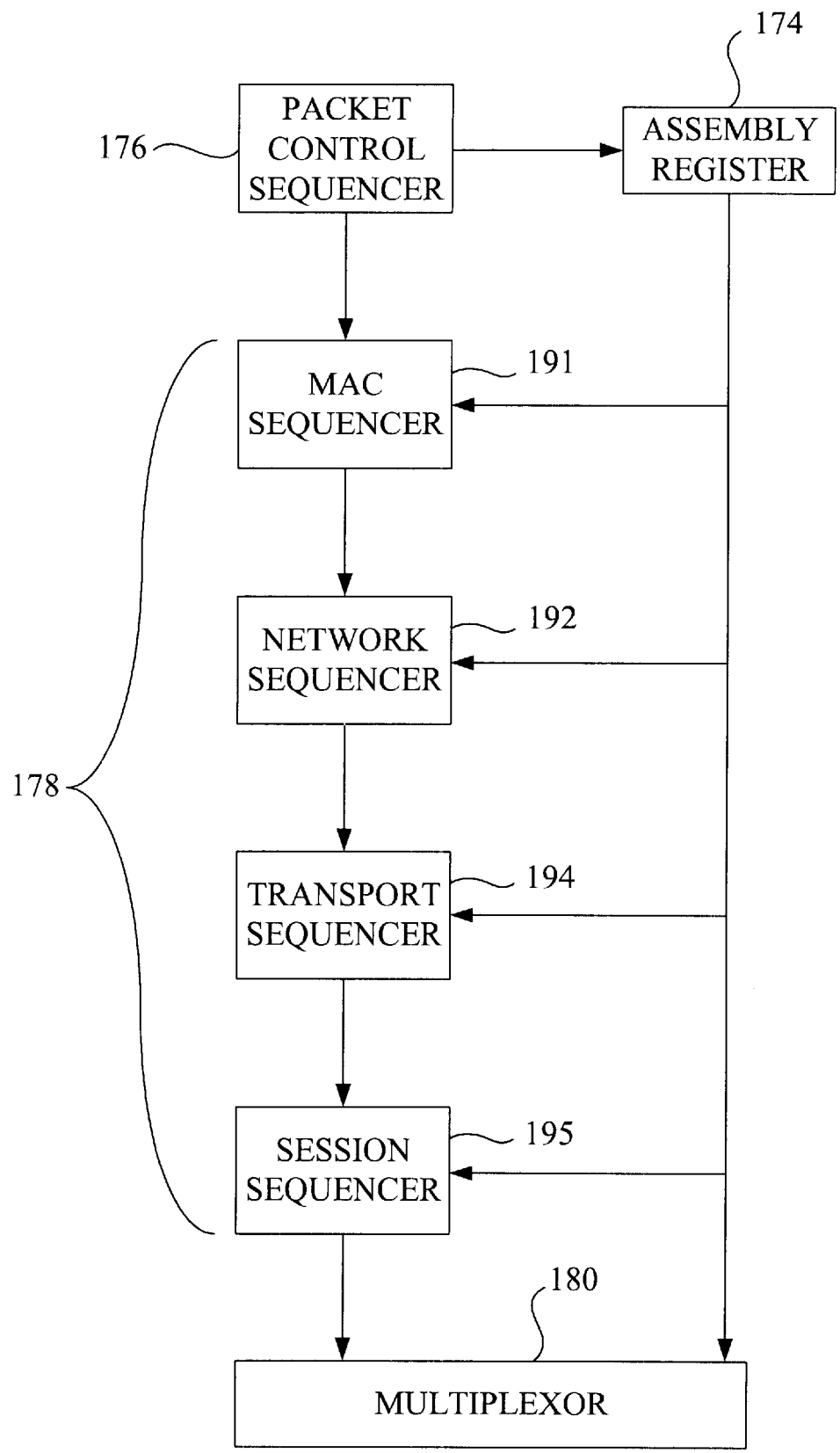
FIG. 8 is a diagram of the fly-by sequencer of FIG. 7 for analyzing header bytes as they are received by the INIC.

FIG. 8 shows that the fly-by sequencer 178 has several tiers, with each tier generally focusing on a particular portion of the packet header and thus on a particular protocol layer, for generating status pertaining to that layer. The fly-by sequencer 178 in this embodiment includes a media access control sequencer 191, a network sequencer 192, a transport sequencer 194 and a session sequencer 195. Sequencers pertaining to higher protocol layers can additionally be provided. The fly-by sequencer 178 is reset by the packet control sequencer 176 and given pointers by the packet control sequencer that tell the fly-by sequencer whether a given byte is available from the assembly register 174. The media access control sequencer 191 determines, by looking at bytes 0–5, that a packet is addressed to host 152 rather than or in addition to another host. Offsets 12 and 13 of the packet are also processed by the media access control sequencer 191 to determine the type field, for example whether the packet is Ethernet or 802.3. If the type field is Ethernet those bytes also tell the media access control sequencer 191 the packet's network protocol type. For the 802.3 case, those bytes instead indicate the length of the entire frame, and the media access control sequencer 191 will check eight bytes further into the packet to determine the network layer type.

For most packets the network sequencer 192 validates that the header length received has the correct length, and checksums the network layer header. For fast-path candidates the network layer header is known to be IP or IPX from analysis done by the media access control sequencer 191. Assuming for example that the type field is 802.3 and the network protocol is IP, the network sequencer 192 analyzes the first bytes of the network layer header, which will begin at byte 22, in order to determine IP type. The first bytes of the IP header will be processed by the network sequencer 192 to determine what IP type the packet involves. Determining that the packet involves, for example, IP version 4, directs further processing by the network sequencer 192, which also looks at the protocol type located ten bytes into the IP header for an indication of the transport header protocol of the packet. For example, for IP over Ethernet, the IP header begins at offset 14, and the protocol type byte is offset 23, which will be processed by network logic to determine whether the transport layer protocol is TCP, for example. From the length of the network layer header, which is typically 20–40 bytes, network sequencer 192 determines the beginning of the packet's transport layer header for validating the transport layer header. Transport sequencer 194 may generate checksums for the transport layer header and data, which may include information from the IP header in the case of TCP at least.

Continuing with the example of a TCP packet, transport sequencer 194 also analyzes the first few bytes in the transport layer portion of the header to determine, in part, the TCP source and destination ports for the message, such as whether the packet is NetBios or other protocols. Byte 12 of the TCP header is processed by the transport sequencer 194 to determine and validate the TCP header length. Byte 13 of the TCP header contains flags that may, aside from ack flags and push flags, indicate unexpected options, such as reset and fin, that may cause the processor to categorize this packet as an exception. TCP offset bytes 16 and 17 are the checksum, which is pulled out and stored by the hardware logic 171 while the rest of the frame is validated against the checksum.

Session sequencer 195 determines the length of the session layer header, which in the case of NetBios is only four bytes, two of which tell the length of the NetBios payload data, but which can be much larger for other protocols. The session sequencer 195 can also be used to categorize the type of message as read or write, for example, for which the fast-path may be particularly beneficial. Further upper layer logic processing, depending upon the message type, can be performed by the hardware logic 171 of packet control sequencer 176 and fly-by sequencer 178. Thus hardware logic 171 intelligently directs hardware processing of the headers by categorization of selected bytes from a single stream of bytes, with the status of the packet being built from classifications determined on the fly. Once the packet control sequencer 176 detects that all of the packet has been processed by the fly-by sequencer 178, the packet control sequencer 176 adds the status information generated by the fly-by sequencer 178 and any status information generated by the packet control sequencer 176, and prepends (adds to the front) that status information to the packet, for convenience in handling the packet by the processor 170. The additional status information generated by the packet control sequencer 176 includes media access controller 172 status information and any errors discovered, or data overflow in either the assembly register or DRAM buffer, or other miscellaneous information regarding the packet. The packet control sequencer 176 also stores entries into a receive buffer queue and a receive statistics queue via the queue manager 184. An advantage of processing a packet by hardware logic 171 is that the packet does not, in contrast with conventional sequential software protocol processing, have to be stored, moved, copied or pulled from storage for processing each protocol layer header, offering dramatic increases in processing efficiency and savings in processing time for each packet. The packets can be processed at the rate bits are received from the network, for example 100 megabits/second for a 100 baseT connection. The time for categorizing a packet received at this rate and having a length of sixty bytes is thus about 5 microseconds. The total time for processing this packet with the hardware logic 171 and sending packet data to its host destination via the fast-path may be about 16 microseconds or less, assuming a 66 MHz PCI bus, whereas conventional software protocol processing by a 300 MHz Pentium II® processor may take as much as 200 microseconds in a busy device. More than an order of magnitude decrease in processing time can thus be achieved with fast-path 159 in comparison with a high-speed CPU employing conventional sequential software protocol processing, demonstrating the dramatic acceleration provided by processing the protocol headers by the hardware logic 171 and processor 170, without even considering the additional time savings afforded by the reduction in CPU interrupts and host bus bandwidth savings.

The processor 170 chooses, for each received message packet held in storage 185, whether that packet is a candidate for the fast-path 159 and, if so, checks to see whether a fast-path has already been set up for the connection that the packet belongs to. To do this, the processor 170 first checks the header status summary to determine whether the packet headers are of a protocol defined for fast-path candidates. If not, the processor 170 commands DMA controllers in the INIC 150 to send the packet to the host for slow-path 158 processing. Even for a slow-path 158 processing of a message, the INIC 150 thus performs initial procedures such as validation and determination of message type, and passes the validated message at least to the data link layer 160 of the host.

For fast-path 159 candidates, the processor 170 checks to see whether the header status summary matches a CCB held by the INIC. If so, the data from the packet is sent along fast-path 159 to the destination 168 in the host. If the fast-path 159 candidate's packet summary does not match a CCB held by the INIC, the packet may be sent to the host 152 for slow-path processing to create a CCB for the message. Employment of the fast-path 159 may also not be needed or desirable for the case of fragmented messages or other complexities. For the vast majority of messages, however, the INIC fast-path 159 can greatly accelerate message processing. The INIC 150 thus provides a single state machine processor 170 that decides whether to send data directly to its destination, based upon information gleaned on the fly, as opposed to the conventional employment of a state machine in each of several protocol layers for determining the destiny of a given packet.

In processing an indication or packet received at the host 152, a protocol driver of the host selects the processing route based upon whether the indication is fast-path or slow-path. A TCP/IP or SPX/IPX message has a connection that is set up from which a CCB is formed by the driver and passed to the INIC for matching with and guiding the fast-path packet to the connection destination 168. For a TTCP/IP message, the driver can create a connection context for the transaction from processing an initial request packet, including locating the message destination 168, and then passing that context to the INIC in the form of a CCB for providing a fast-path for a reply from that destination. A CCB includes connection and state information regarding the protocol layers and packets of the message. Thus a CCB can include source and destination media access control (MAC) addresses, source and destination IP or IPX addresses, source and destination TCP or SPX ports, TCP variables such as timers, receive and transmit windows for sliding window protocols, and information indicating the session layer protocol.

Caching the CCBs in a hash table in the INIC provides quick comparisons with words summarizing incoming packets to determine whether the packets can be processed via the fast-path 159, while the full CCBs are also held in the INIC for processing. Other ways to accelerate this comparison include software processes such as a B-tree or hardware assists such as a content addressable memory (CAM). When INIC microcode or comparator circuits detect a match with the CCB, a DMA controller places the data from the packet in the destination 168, without any interrupt by the CPU, protocol processing or copying. Depending upon the type of message received, the destination of the data may be the session, presentation or application layers, or a file buffer cache in the host 152.

Figure 9:
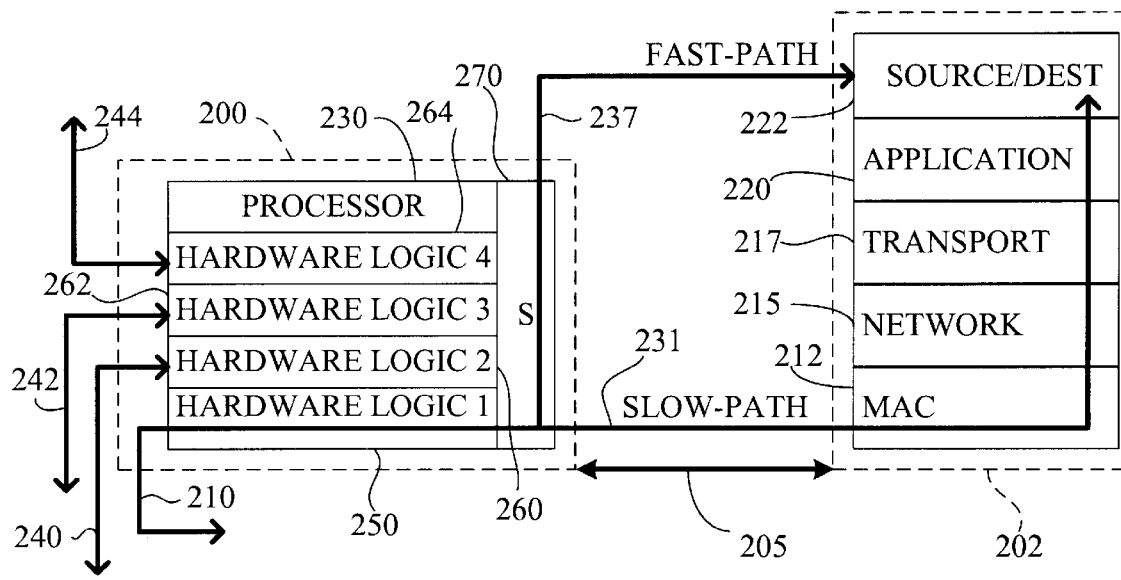
FIG. 9 is a diagram of information flow for a second embodiment of an INIC associated with a server having a TCP/IP processing stack.

FIG. 9 shows an INIC 200 connected to a host 202 that is employed as a file server. This INIC provides a network interface for several network connections employing the 802.3u standard, commonly known as Fast Ethernet. The INIC 200 is connected by a PCI bus 205 to the server 202, which maintains a TCP/IP or SPX/IPX protocol stack including MAC layer 212, network layer 215, transport layer 217 and application layer 220, with a source/destination 222 shown above the application layer, although as mentioned earlier the application layer can be the source or destination. The INIC is also connected to network lines 210, 240, 242 and 244, which are preferably Fast Ethernet, twisted pair, fiber optic, coaxial cable or other lines each allowing data transmission of 100 Mb/s, while faster and slower data rates are also possible. Network lines 210, 240, 242 and 244 are each connected to a dedicated row of hardware circuits which can each validate and summarize message packets received from their respective network line. Thus line 210 is connected with a first horizontal row of sequencers 250, line 240 is connected with a second horizontal row of sequencers 260, line 242 is connected with a third horizontal row of sequencers 262 and line 244 is connected with a fourth horizontal row of sequencers 264. After a packet has been validated and summarized by one of the horizontal hardware rows it is stored along with its status summary in storage 270.

A network processor 230 determines, based on that summary and a comparison with any CCBs stored in the INIC 200, whether to send a packet along a slow-path 231 for processing by the host. A large majority of packets can avoid such sequential processing and have their data portions sent by DMA along a fast-path 237 directly to the data destination 222 in the server according to a matching CCB. Similarly, the fast-path 237 provides an avenue to send data directly from the source 222 to any of the network lines by processor 230 division of the data into packets and addition of full headers for network transmission, again minimizing CPU processing and interrupts. For clarity only horizontal sequencer 250 is shown active; in actuality each of the sequencer rows 250, 260, 262 and 264 offers full duplex communication, concurrently with all other sequencer rows. The specialized INIC 200 is much faster at working with message packets than even advanced general-purpose host CPUs that processes those headers sequentially according to the software protocol stack.

Figure 10:
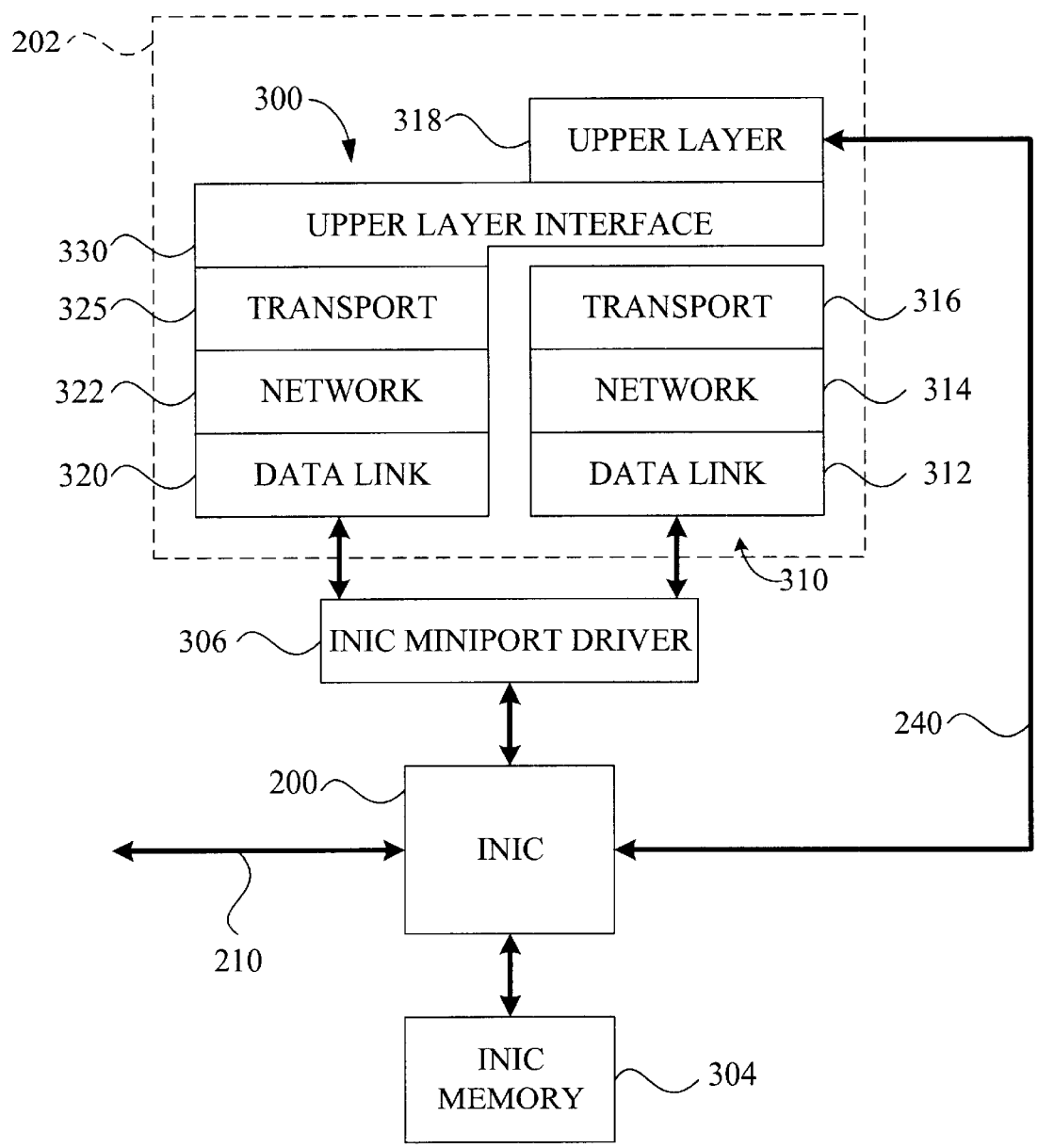
FIG. 10 is a diagram of a command driver installed in the host of FIG. 9 for creating and controlling a communication control block for the fast-path.

One of the most commonly used network protocols for large messages such as file transfers is server message block (SMB) over TCP/IP. SMB can operate in conjunction with redirector software that determines whether a required resource for a particular operation, such as a printer or a disk upon which a file is to be written, resides in or is associated with the host from which the operation was generated or is located at another host connected to the network, such as a file server. SMB and server/redirector are conventionally serviced by the transport layer; in the present invention SMB and redirector can instead be serviced by the INIC. In this case, sending data by the DMA controllers from the INIC buffers when receiving a large SMB transaction may greatly reduce interrupts that the host must handle. Moreover, this DMA generally moves the data to its final destination in the file device cache. An SMB transmission of the present invention follows essentially the reverse of the above described SMB receive, with data transferred from the host to the INIC and stored in buffers, while the associated protocol headers are prepended to the data in the INIC, for transmission via a network line to a remote host. Processing by the INIC of the multiple packets and multiple TCP, IP, NetBios and SMB protocol layers via custom hardware and without repeated interrupts of the host can greatly increase the speed of transmitting an SMB message to a network line. As shown in FIG. 10, for controlling whether a given message is processed by the host 202 or by the INIC 200, a message command driver 300 may be installed in host 202 to work in concert with a host protocol stack 310. The command driver 300 can intervene in message reception or transmittal, create CCBs and send or receive CCBs from the INIC 200, so that functioning of the INIC, aside from improved performance, is transparent to a user. Also shown is an INIC memory 304 and an INIC miniport driver 306, which can direct message packets received from network 210 to either the conventional protocol stack 310 or the command protocol stack 300, depending upon whether a packet has been labeled as a fast-path candidate. The conventional protocol stack 310 has a data link layer 312, a network layer 314 and a transport layer 316 for conventional, lower layer processing of messages that are not labeled as fast-path candidates and therefore not processed by the command stack 300. Residing above the lower layer stack 310 is an upper layer 318, which represents a session, presentation and/or application layer, depending upon the message communicated. The command driver 300 similarly has a data link layer 320, a network layer 322 and a transport layer 325.

The driver 300 includes an upper layer interface 330 that determines, for transmission of messages to the network 210, whether a message transmitted from the upper layer 318 is to be processed by the command stack 300 and subsequently the INIC fast-path, or by the conventional stack 310. When the upper layer interface 330 receives an appropriate message from the upper layer 318 that would conventionally be intended for transmission to the network after protocol processing by the protocol stack of the host, the message is passed to driver 300. The INIC then acquires network-sized portions of the message data for that transmission via INIC DMA units, prepends headers to the data portions and sends the resulting message packets down the wire. Conversely, in receiving a TCP, TTCP, SPX or similar message packet from the network 210 to be used in setting up a fast-path connection, miniport driver 306 diverts that message packet to command driver 300 for processing. The driver 300 processes the message packet to create a context for that message, with the driver 302 passing the context and command instructions back to the INIC 200 as a CCB for sending data of subsequent messages for the same connection along a fast-path. Hundreds of TCP, TTCP, SPX or similar CCB connections may be held indefinitely by the INIC, although a least recently used (LRU) algorithm is employed for the case when the INIC cache is full. The driver 300 can also create a connection context for a TTCP request which is passed to the INIC 200 as a CCB, allowing fast-path transmission of a TTCP reply to the request. A message having a protocol that is not accelerated can be processed conventionally by protocol stack 310.

Figure 11:
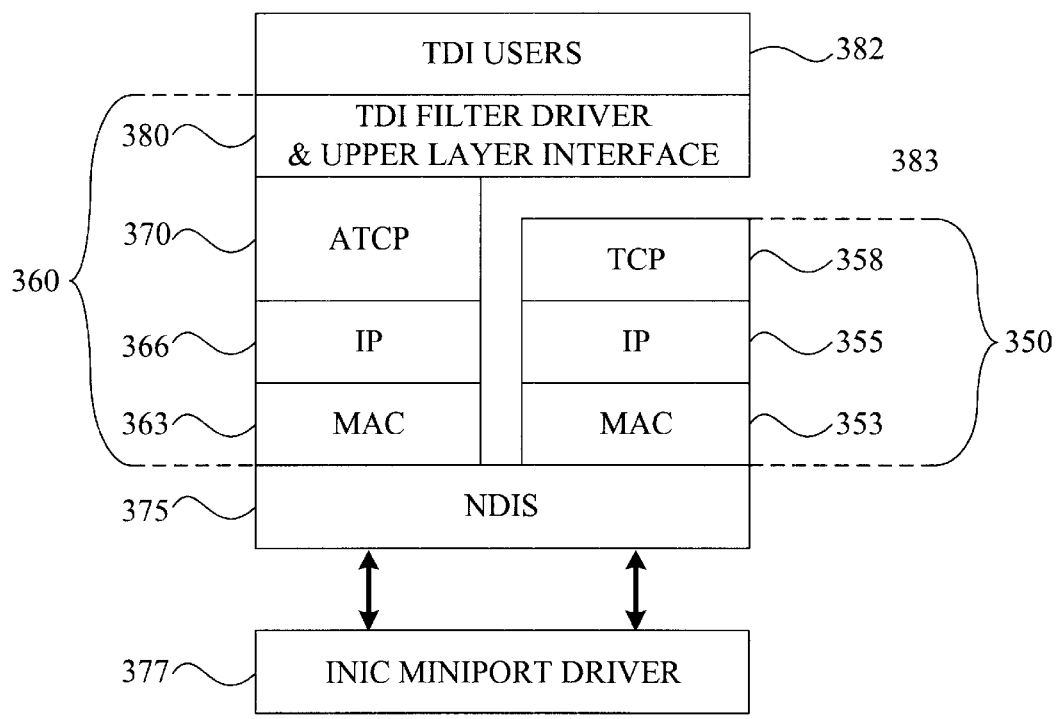
FIG. 11 is a diagram of the TCP/IP stack and command driver of FIG. 10 configured for NetBios communications.

FIG. 11 shows a TCP/IP implementation of command driver software for Microsoft® protocol messages. A conventional host protocol stack 350 includes MAC layer 353, IP layer 355 and TCP layer 358. A command driver 360 works in concert with the host stack 350 to process network messages. The command driver 360 includes a MAC layer 363, an IP layer 366 and an Alacritech TCP (ATCP) layer 373. The conventional stack 350 and command driver 360 share a network driver interface specification (NDIS) layer 375, which interacts with the INIC miniport driver 306. The INIC miniport driver 306 sorts receive indications for processing by either the conventional host stack 350 or the ATCP driver 360. A TDI filter driver and upper layer interface 380 similarly determines whether messages sent from a TDI user 382 to the network are diverted to the command driver and perhaps to the fast-path of the INIC, or processed by the host stack.

Figure 12:
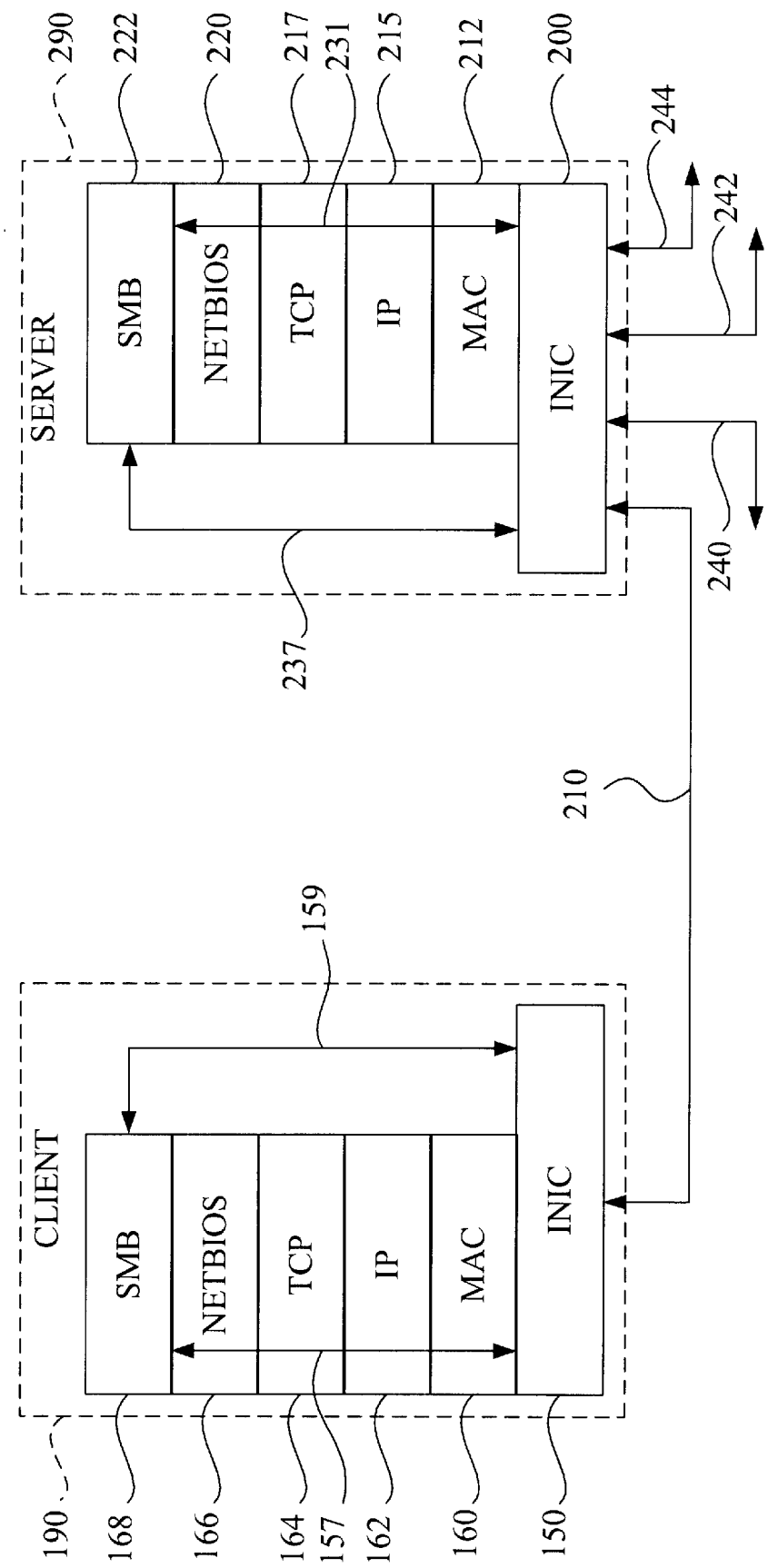
FIG. 12 is a diagram of a communication exchange between the client of FIG. 6 and the server of FIG. 9.

FIG. 12 depicts a typical SMB exchange between a client 190 and server 290, both of which have communication devices of the present invention, the communication devices each holding a CCB defining their connection for fast-path movement of data. The client 190 includes INIC 150, 802.3 compliant data link layer 160, IP layer 162, TCP layer 164, NetBios layer 166, and SMB layer 168. The client has a slow-path 157 and fast-path 159 for communication processing. Similarly, the server 290 includes INIC 200, 802.3 compliant data link layer 212, IP layer 215, TCP layer 217, NetBios layer 220, and SMB 222. The server is connected to network lines 240, 242 and 244, as well as line 210 which is connected to client 190. The server also has a slow-path 231 and fast-path 237 for communication processing. Assuming that the client 190 wishes to read a 100 KB file on the server 290, the client may begin by sending a Read Block Raw (RBR) SMB command across network 210 requesting the first 64 KB of that file on the server 290. The RBR command may be only 76 bytes, for example, so the INIC 200 on the server will recognize the message type (SMB) and relatively small message size, and send the 76 bytes directly via the fast-path to NetBios of the server. NetBios will give the data to SMB, which processes the Read request and fetches the 64 KB of data into server data buffers. SMB then calls NetBios to send the data, and NetBios outputs the data for the client. In a conventional host, NetBios would call TCP output and pass 64 KB to TCP, which would divide the data into 1460 byte segments and output each segment via IP and eventually MAC (slow-path 231). In the present case, the 64 KB data goes to the ATCP driver along with an indication regarding the client-server SMB connection, which indicates a CCB held by the INIC. The INIC 200 then proceeds to DMA 1460 byte segments from the host buffers, add the appropriate headers for TCP, IP and MAC at one time, and send the completed packets on the network 210 (fast-path 237). The INIC 200 will repeat this until the whole 64 KB transfer has been sent. Usually after receiving acknowledgement from the client that the 64 KB has been received, the INIC will then send the remaining 36 KB also by the fast-path 237.

With INIC 150 operating on the client 190 when this reply arrives, the INIC 150 recognizes from the first frame received that this connection is receiving fast-path 159 processing (TCP/IP, NetBios, matching a CCB), and the ATCP may use this first frame to acquire buffer space for the message. This latter case is done by passing the first 128 bytes of the NetBios portion of the frame via the ATCP fast-path directly to the host NetBios; that will give NetBios/SMB all of the frame's headers. NetBios/SMB will analyze these headers, realize by matching with a request ID that this is a reply to the original RawRead connection, and give the ATCP a 64K list of buffers into which to place the data. At this stage only one frame has arrived, although more may arrive while this processing is occurring. As soon as the client buffer list is given to the ATCP, it passes that transfer information to the INIC 150, and the INIC 150 starts DMAing any frame data that has accumulated into those buffers.

Figure 13:
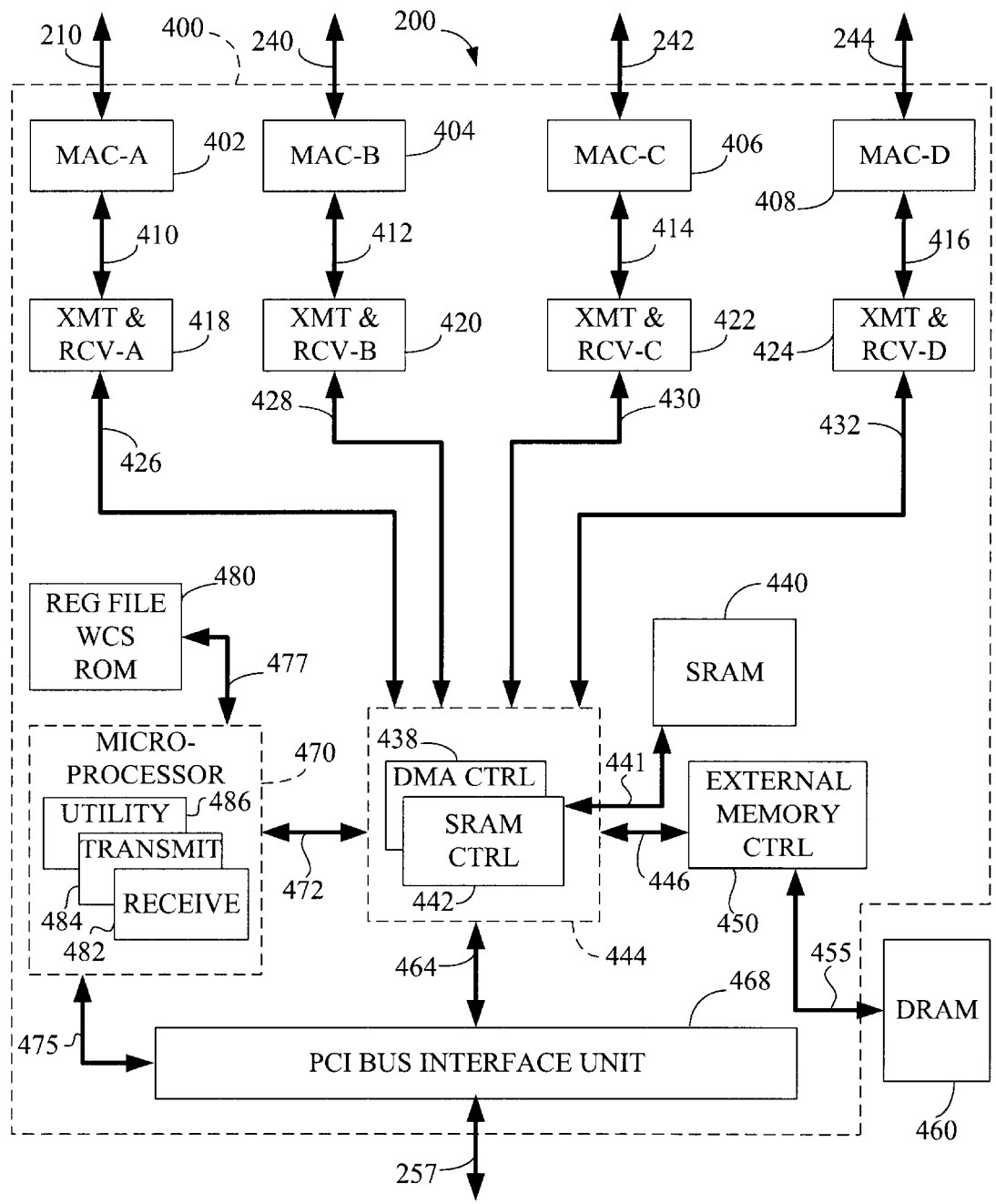
FIG. 13 is a diagram of hardware functions included in the INIC of FIG. 9.

FIG. 13 provides a simplified diagram of the INIC 200, which combines the functions of a network interface controller and a protocol processor in a single ASIC chip 400. The INIC 200 in this embodiment offers a full-duplex, four channel, 10/100-Megabit per second (Mbps) intelligent network interface controller that is designed for high speed protocol processing for server applications. Although designed specifically for server applications, the INIC 200 can be connected to personal computers, workstations, routers or other hosts anywhere that TCP/IP, TTCP/IP or SPX/IPX protocols are being utilized.

The INIC 200 is connected with four network lines 210, 240, 242 and 244, which may transport data along a number of different conduits, such as twisted pair, coaxial cable or optical fiber, each of the connections providing a media independent interface (MII) via commercially available physical layer chips, such as model 80220/80221 Ethernet Media Interface Adapter from SEEQ Technology Incorporated, 47200 Bayside Parkway, Fremont, Calif. 94538. The lines preferably are 802.3 compliant and in connection with the INIC constitute four complete Ethernet nodes, the INIC supporting 10Base-T, 10Base-T2, 100Base-TX, 100Base-FX and 100Base-T4 as well as future interface standards. Physical layer identification and initialization is accomplished through host driver initialization routines. The connection between the network lines 210, 240, 242 and 244 and the INIC 200 is controlled by MAC units MAC-A 402, MAC-B 404, MAC-C 406 and MAC-D 408 which contain logic circuits for performing the basic functions of the MAC sublayer, essentially controlling when the INIC accesses the network lines 210, 240, 242 and 244. The MAC units 402–408 may act in promiscuous, multicast or unicast modes, allowing the INIC to function as a network monitor, receive broadcast and multicast packets and implement multiple MAC addresses for each node. The MAC units 402–408 also provide statistical information that can be used for simple network management protocol (SNMP).

The MAC units 402, 404, 406 and 408 are each connected to a transmit and receive sequencer, XMT & RCV-A 418, XMT & RCV-B 420, XMT & RCV-C 422 and XMT & RCV-D 424, by wires 410, 412, 414 and 416, respectively. Each of the transmit and receive sequencers can perform several protocol processing steps on the fly as message frames pass through that sequencer. In combination with the MAC units, the transmit and receive sequencers 418–422 can compile the packet status for the data link, network, transport, session and, if appropriate, presentation and application layer protocols in hardware, greatly reducing the time for such protocol processing compared to conventional sequential software engines. The transmit and receive sequencers 410–414 are connected, by lines 426, 428, 430 and 432 to an SRAM and DMA controller 444, which includes DMA controllers 438 and SRAM controller 442. Static random access memory (SRAM) buffers 440 are coupled with SRAM controller 442 by line 441. The SRAM and DMA controllers 444 interact across line 446 with external memory control 450 to send and receive frames via external memory bus 455 to and from dynamic random access memory (DRAM) buffers 460, which is located adjacent to the IC chip 400. The DRAM buffers 460 may be configured as 4 MB, 8 MB, 16 MB or 32 MB, and may optionally be disposed on the chip. The SRAM and DMA controllers 444 are connected via line 464 to a PCI Bus Interface Unit (BIU) 468, which manages the interface between the INIC 200 and the PCI interface bus 257. The 64-bit, multiplexed BIU 468 provides a direct interface to the PCI bus 257 for both slave and master functions. The INIC 200 is capable of operating in either a 64-bit or 32-bit PCI environment, while supporting 64-bit addressing in either configuration.

A microprocessor 470 is connected by line 472 to the SRAM and DMA controllers 444, and connected via line 475 to the PCI BIU 468. Microprocessor 470 instructions and register files reside in an on chip control store 480, which includes a writable on-chip control store (WCS) of SRAM and a read only memory (ROM), and is connected to the microprocessor by line 477. The microprocessor 470 offers a programmable state machine which is capable of processing incoming frames, processing host commands, directing network traffic and directing PCI bus traffic. Three processors are implemented using shared hardware in a three level pipelined architecture that launches and completes a single instruction for every clock cycle. A receive processor 482 is primarily used for receiving communications while a transmit processor 484 is primarily used for transmitting communications in order to facilitate full duplex communication, while a utility processor 486 offers various functions including overseeing and controlling PCI register access.

The instructions for the three processors 482, 484 and 486 reside in the on-chip control-store 480. Thus the functions of the three processors can be easily redefined, so that the microprocessor 470 can adapted for a given environment. For instance, the amount of processing required for receive functions may outweigh that required for either transmit or utility functions. In this situation, some receive functions may be performed by the transmit processor 484 and/or the utility processor 486. Alternatively, an additional level of pipelining can be created to yield four or more virtual processors instead of three, with the additional level devoted to receive functions.

The INIC 200 in this embodiment can support up to 256 CCBs which are maintained in a table in the DRAM 460. There is also, however, a CCB index in hash order in the SRAM 440 to save sequential searching. Once a hash has been generated, the CCB is cached in SRAM, with up to sixteen cached CCBs in SRAM in this example. Allocation of the sixteen CCBs cached in SRAM is handled by a least recently used register, described below. These cache locations are shared between the transmit 484 and receive 486 processors so that the processor with the heavier load is able to use more cache buffers. There are also eight header buffers and eight command buffers to be shared between the sequencers. A given header or command buffer is not statically linked to a specific CCB buffer, as the link is dynamic on a per-frame basis.

Figure 14:
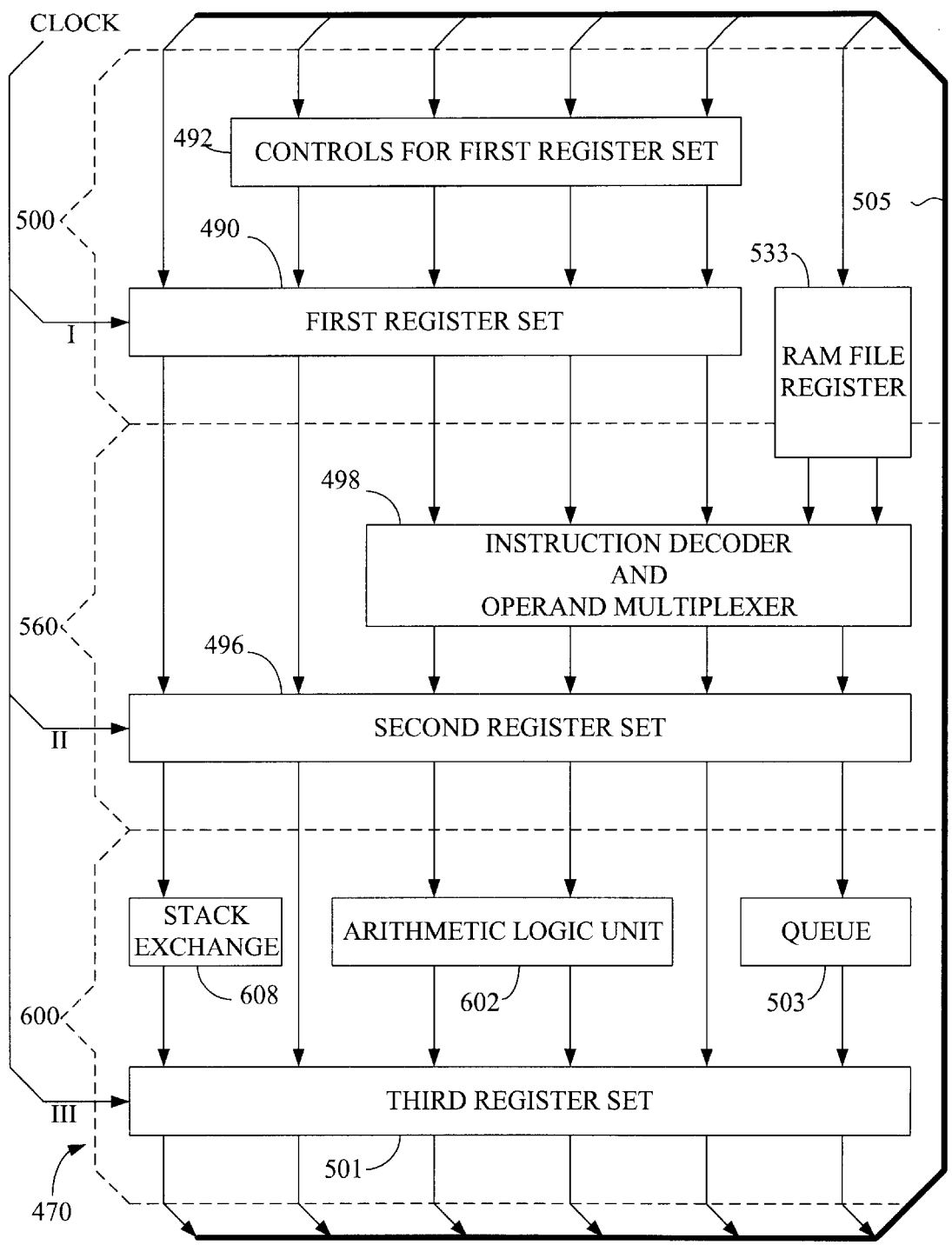
FIG. 14 is a diagram of a trio of pipelined microprocessors included in the INIC of FIG. 13, including three phases with a processor in each phase.

FIG. 14 shows an overview of the pipelined microprocessor 470, in which instructions for the receive, transmit and utility processors are executed in three alternating phases according to Clock increments I, II and III, the phases corresponding to each of the pipeline stages. Each phase is responsible for different functions, and each of the three processors occupies a different phase during each Clock increment. Each processor usually operates upon a different instruction stream from the control store 480, and each carries its own program counter and status through each of the phases.

In general, a first instruction phase 500 of the pipelined microprocessors completes an instruction and stores the result in a destination operand, fetches the next instruction, and stores that next instruction in an instruction register. A first register set 490 provides a number of registers including the instruction register, and a set of controls 492 for first register set provides the controls for storage to the first register set 490. Some items pass through the first phase without modification by the controls 492, and instead are simply copied into the first register set 490 or a RAM file register 533. A second instruction phase 560 has an instruction decoder and operand multiplexer 498 that generally decodes the instruction that was stored in the instruction register of the first register set 490 and gathers any operands which have been generated, which are then stored in a decode register of a second register set 496. The first register set 490, second register set 496 and a third register set 501, which is employed in a third instruction phase 600, include many of the same registers, as will be seen in the more detailed views of FIGS. 15A–C. The instruction decoder and operand multiplexer 498 can read from two address and data ports of the RAM file register 533, which operates in both the first phase 500 and second phase 560. A third phase 600 of the processor 470 has an arithmetic logic unit (ALU) 602 which generally performs any ALU operations on the operands from the second register set, storing the results in a results register included in the third register set 501. A stack exchange 608 can reorder register stacks, and a queue manager 503 can arrange queues for the processor 470, the results of which are stored in the third register set. The instructions continue with the first phase then following the third phase, as depicted by a circular pipeline 505. Note that various functions have been distributed across the three phases of the instruction execution in order to minimize the combinatorial delays within any given phase. With a frequency in this embodiment of 66 MHz, each Clock increment takes 15 nanoseconds to complete, for a total of 45 nanoseconds to complete one instruction for each of the three processors. The rotating instruction phases are depicted in more detail in FIGS. 15A–C, in which each phase is shown in a different figure.

Figure 15A:
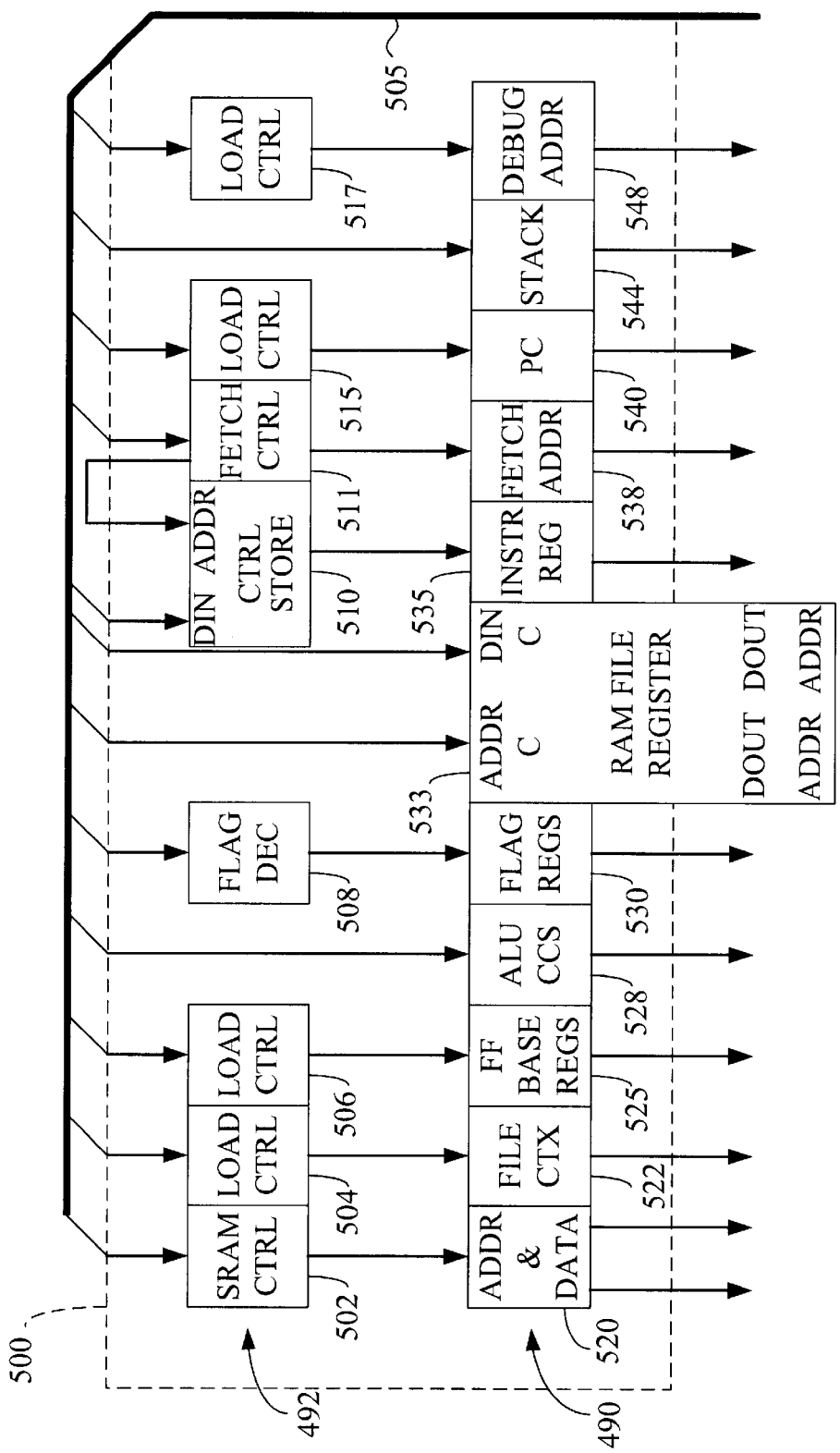
FIG. 15A is a diagram of a first phase of the pipelined microprocessor of FIG. 14.

More particularly, FIG. 15A shows some specific hardware functions of the first phase 500, which generally includes the first register set 490 and related controls 492. The controls for the first register set 492 includes an SRAM control 502, which is a logical control for loading address and write data into SRAM address and data registers 520. Thus the output of the ALU 602 from the third phase 600 may be placed by SRAM control 502 into an address register or data register of SRAM address and data registers 520. A load control 504 similarly provides controls for writing a context for a file to file context register 522, and another load control 506 provides controls for storing a variety of miscellaneous data to flip-flop registers 525. ALU condition codes, such as whether a carried bit is set, get clocked into ALU condition codes register 528 without an operation performed in the first phase 500. Flag decodes 508 can perform various functions, such as setting locks, that get stored in flag registers 530.

The RAM file register 533 has a single write port for addresses and data and two read ports for addresses and data, so that more than one register can be read from at one time. As noted above, the RAM file register 533 essentially straddles the first and second phases, as it is written in the first phase 500 and read from in the second phase 560. A control store instruction 510 allows the reprogramming of the processors due to new data in from the control store 480, not shown in this figure, the instructions stored in an instruction register 535. The address for this is generated in a fetch control register 511, which determines which address to fetch, the address stored in fetch address register 538. Load control 515 provides instructions for a program counter 540, which operates much like the fetch address for the control store. A last-in first-out stack 544 of three registers is copied to the first register set without undergoing other operations in this phase. Finally, a load control 517 for a debug address 548 is optionally included, which allows correction of errors that may occur.

Figure 15B:
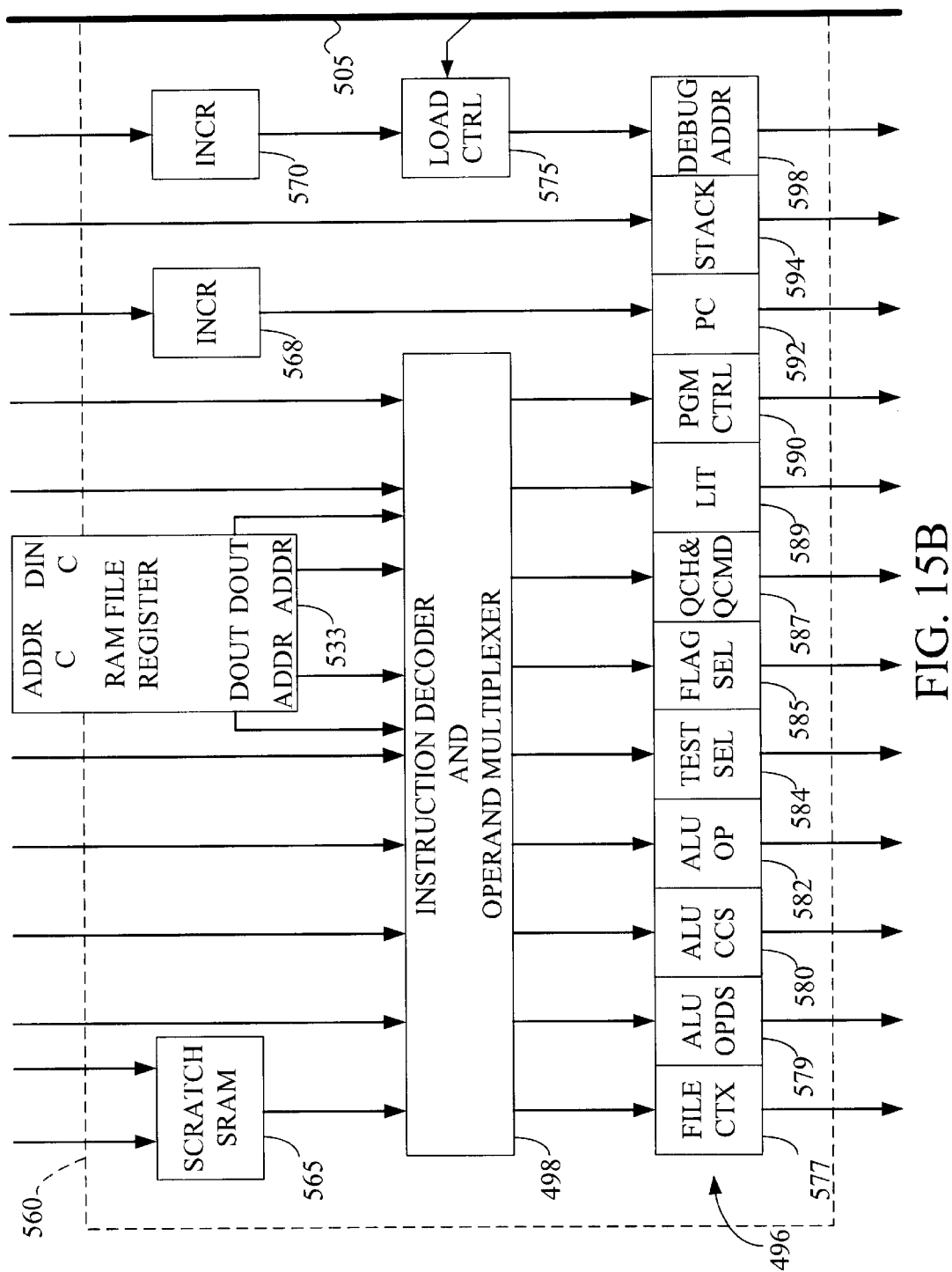
FIG. 15B is a diagram of a second phase of the pipelined microprocessor of FIG. 14.

FIG. 15B depicts the second microprocessor phase 560, which includes reading addresses and data out of the RAM file register 533. A scratch SRAM 565 is written from SRAM address and data register 520 of the first register set, which includes a register that passes through the first two phases to be incremented in the third. The scratch SRAM 565 is read by the instruction decoder and operand multiplexer 498, as are most of the registers from the first register set, with the exception of the stack 544, debug address 548 and SRAM address and data register mentioned above. The instruction decoder and operand multiplexer 498 looks at the various registers of set 490 and SRAM 565, decodes the instructions and gathers the operands for operation in the next phase, in particular determining the operands to provide to the ALU 602 below. The outcome of the instruction decoder and operand multiplexer 498 is stored to a number of registers in the second register set 496, including ALU operands 579 and 582, ALU condition code register 580, and a queue channel and command 587 register, which in this embodiment can control thirty-two queues. Several of the registers in set 496 are loaded fairly directly from the instruction register 535 above without substantial decoding by the decoder 498, including a program control 590, a literal field 589, a test select 584 and a flag select 585. Other registers such as the file context 522 of the first phase 500 are always stored in a file context 577 of the second phase 560, but may also be treated as an operand that is gathered by the multiplexer 572. The stack registers 544 are simply copied in stack register 594. The program counter 540 is incremented 568 in this phase and stored in register 592. Also incremented 570 is the optional debug address 548, and a load control 575 may be fed from the pipeline 505 at this point in order to allow error control in each phase, the result stored in debug address 598.

Figure 15C:
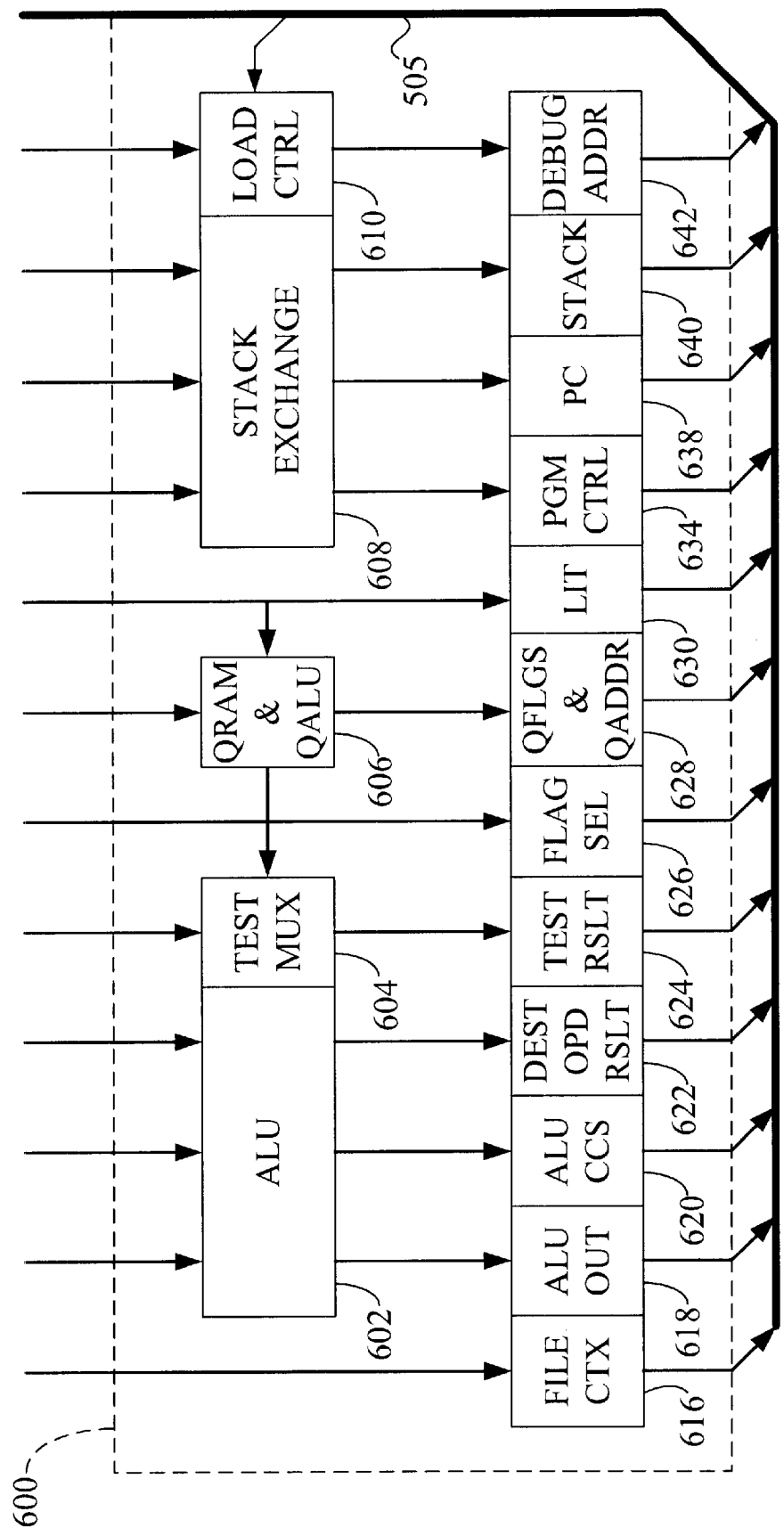
FIG. 15C is a diagram of a third phase of the pipelined microprocessor of FIG. 14.

FIG. 15C depicts the third microprocessor phase 600, which includes ALU and queue operations. The ALU 602 includes an adder, priority encoders and other standard logic functions. Results of the ALU are stored in registers ALU output 618, ALU condition codes 620 and destination operand results 622. A file context register 616, flag select register 626 and literal field register 630 are simply copied from the previous phase 560. A test multiplexer 604 is provided to determine whether a conditional jump results in a jump, with the results stored in a test results register 624. The test multiplexer 604 may instead be performed in the first phase 500 along with similar decisions such as fetch control 511. A stack exchange 608 shifts a stack up or down by fetching a program counter from stack 594 or putting a program counter onto that stack, results of which are stored in program control 634, program counter 638 and stack 640 registers. The SRAM address may optionally be incremented in this phase 600. Another load control 610 for another debug address 642 may be forced from the pipeline 505 at this point in order to allow error control in this phase also. A QRAM & QALU 606, shown together in this figure, read from the queue channel and command register 587, store in SRAM and rearrange queues, adding or removing data and pointers as needed to manage the queues of data, sending results to the test multiplexer 604 and a queue flags and queue address register 628. Thus the QRAM & QALU 606 assume the duties of managing queues for the three processors, a task conventionally performed sequentially by software on a CPU, the queue manager 606 instead providing accelerated and substantially parallel hardware queuing.

Figure 16:
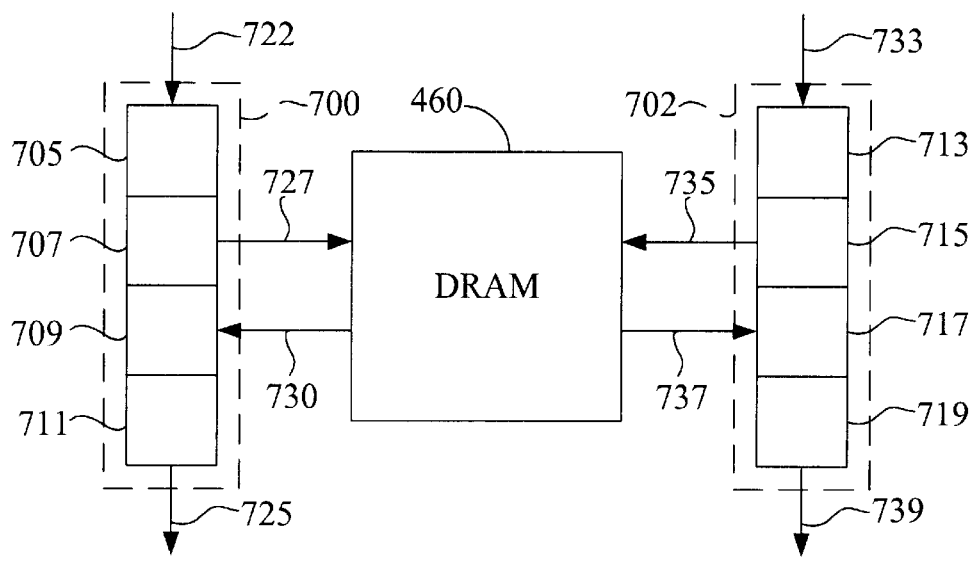
FIG. 16 is a diagram of a plurality of queue storage units that interact with the microprocessor of FIG. 14 and include SRAM and DRAM.

FIG. 16 depicts two of the thirty-two hardware queues that are managed by the queue Manager 606, with each of the queues having an SRAM head, an SRAM tail and the ability to queue information in a DRAM body as well, allowing expansion and individual configuration of each queue. Thus FIFO 700 has SRAM storage units, 705, 707, 709 and 711, each containing eight bytes for a total of thirty-two bytes, although the number and capacity of these units may vary in other embodiments. Similarly, FIFO 702 has SRAM storage units 713, 715, 717 and 719. SRAM units 705 and 707 are the head of FIFO 700 and units 709 and 711 are the tail of that FIFO, while units 713 and 715 are the head of FIFO 702 and units 717 and 719 are the tail of that FIFO. Information for FIFO 700 may be written into head units 705 or 707, as shown by arrow 722, and read from tail units 711 or 709, as shown by arrow 725. A particular entry, however, may be both written to and read from head units 705 or 707, or may be both written to and read from tail units 709 or 711, minimizing data movement and latency. Similarly, information for FIFO 702 is typically written into head units 713 or 715, as shown by arrow 733, and read from tail units 717 or 719, as shown by arrow 739, but may instead be read from the same head or tail unit to which it was written.

The SRAM FEFOS 700 and 702 are both connected to DRAM 460, which allows virtually unlimited expansion of those FIFOS to handle situations in which the SRAM head and tail are full. For example a first of the thirty-two queues, labeled Q-zero, may queue an entry in DRAM 460, as shown by arrow 727, by DMA units acting under direction of the queue manager, instead of being queued in the head or tail of FIFO 700. Entries stored in DRAM 460 return to SRAM unit 709, as shown by arrow 730, extending the length and fall-through time of that FIFO. Diversion from SRAM to DRAM is typically reserved for when the SRAM is full, since DRAM is slower and DMA movement causes additional latency. Thus Q-zero may comprise the entries stored by queue manager 606 in both the FIFO 700 and the DRAM 460. Likewise, information bound for FIFO 702, which may correspond to Q-twenty-seven, for example, can be moved by DMA into DRAM 460, as shown by arrow 735. The capacity for queuing in cost-effective albeit slower DRAM 460 is user-definable during initialization, allowing the queues to change in size as desired. Information queued in DRAM 460 is returned to SRAM unit 717, as shown by arrow 737.

Figure 17:
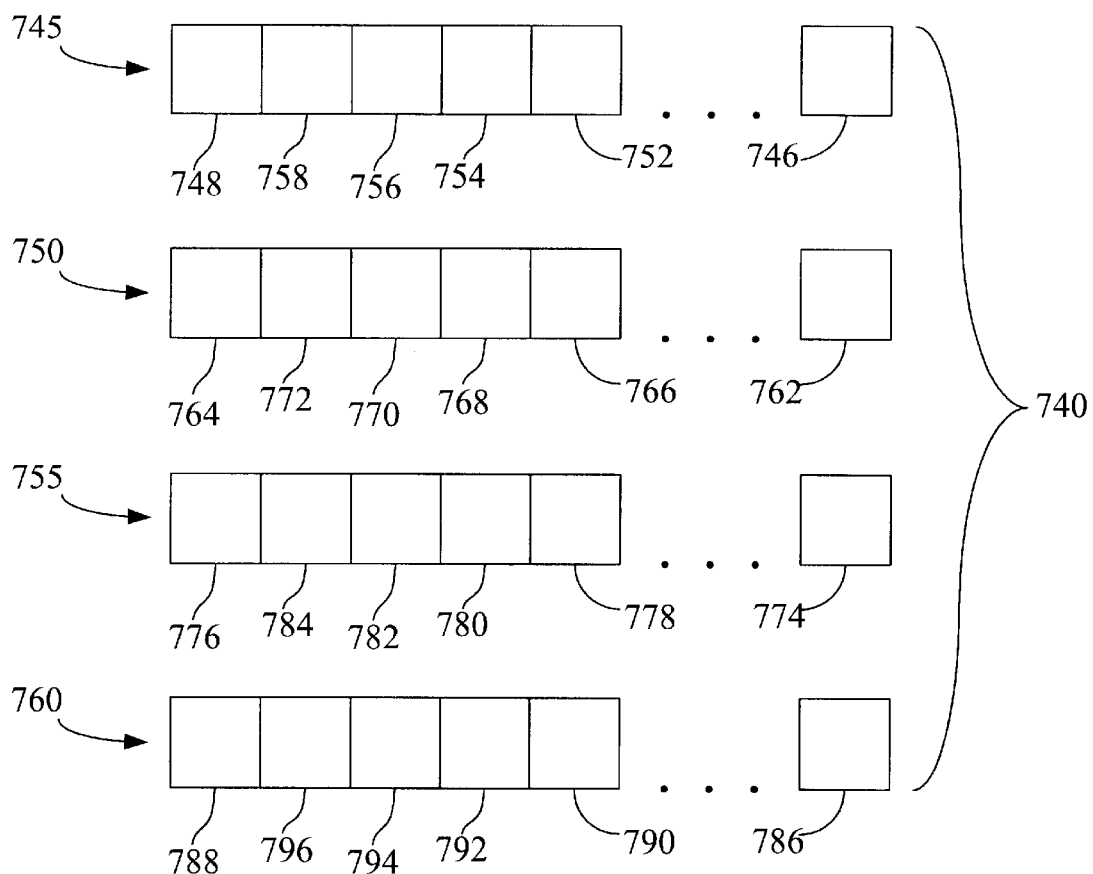
FIG. 17 is a diagram of a set of status registers for the queues storage units of FIG. 16.

Status for each of the thirty-two hardware queues is conveniently maintained in and accessed from a set 740 of four, thirty-two bit registers, as shown in FIG. 17, in which a specific bit in each register corresponds to a specific queue. The registers are labeled Q-Out_Ready 745, Q-In_Ready 750, Q-Empty 755 and Q-Full 760. If a particular bit is set in the Q-Out_Ready register 750, the queue corresponding to that bit contains information that is ready to be read, while the setting of the same bit in the Q-In_Ready 752 register means that the queue is ready to be written. Similarly, a positive setting of a specific bit in the Q-Empty register 755 means that the queue corresponding to that bit is empty, while a positive setting of a particular bit in the Q-Full register 760 means that the queue corresponding to that bit is full. Thus Q-Out_Ready 745 contains bits zero 746 through thirty-one 748, including bits twenty-seven 752, twenty-eight 754, twenty-nine 756 and thirty 758. Q-In_Ready 750 contains bits zero 762 through thirty-one 764, including bits twenty-seven 766, twenty-eight 768, twenty-nine 770 and thirty 772. Q-Empty 755 contains bits zero 774 through thirty-one 776, including bits twenty-seven 778, twenty-eight 780, twenty-nine 782 and thirty 784, and Q-full 760 contains bits zero 786 through thirty-one 788, including bits twenty-seven 790, twenty-eight 792, twenty-nine 794 and thirty 796.

Q-zero, corresponding to FIFO 700, is a free buffer queue, which holds a list of addresses for all available buffers. This queue is addressed when the microprocessor or other devices need a free buffer address, and so commonly includes appreciable DRAM 460. Thus a device needing a free buffer address would check with Q-zero to obtain that address. Q-twenty-seven, corresponding to FIFO 702, is a receive buffer descriptor queue. After processing a received frame by the receive sequencer the sequencer looks to store a descriptor for the frame in Q-twenty-seven. If a location for such a descriptor is immediately available in SRAM, bit twenty-seven 766 of Q-In_Ready 750 will be set. If not, the sequencer must wait for the queue manager to initiate a DMA move from SRAM to DRAM, thereby freeing space to store the receive descriptor.

Figure 18:
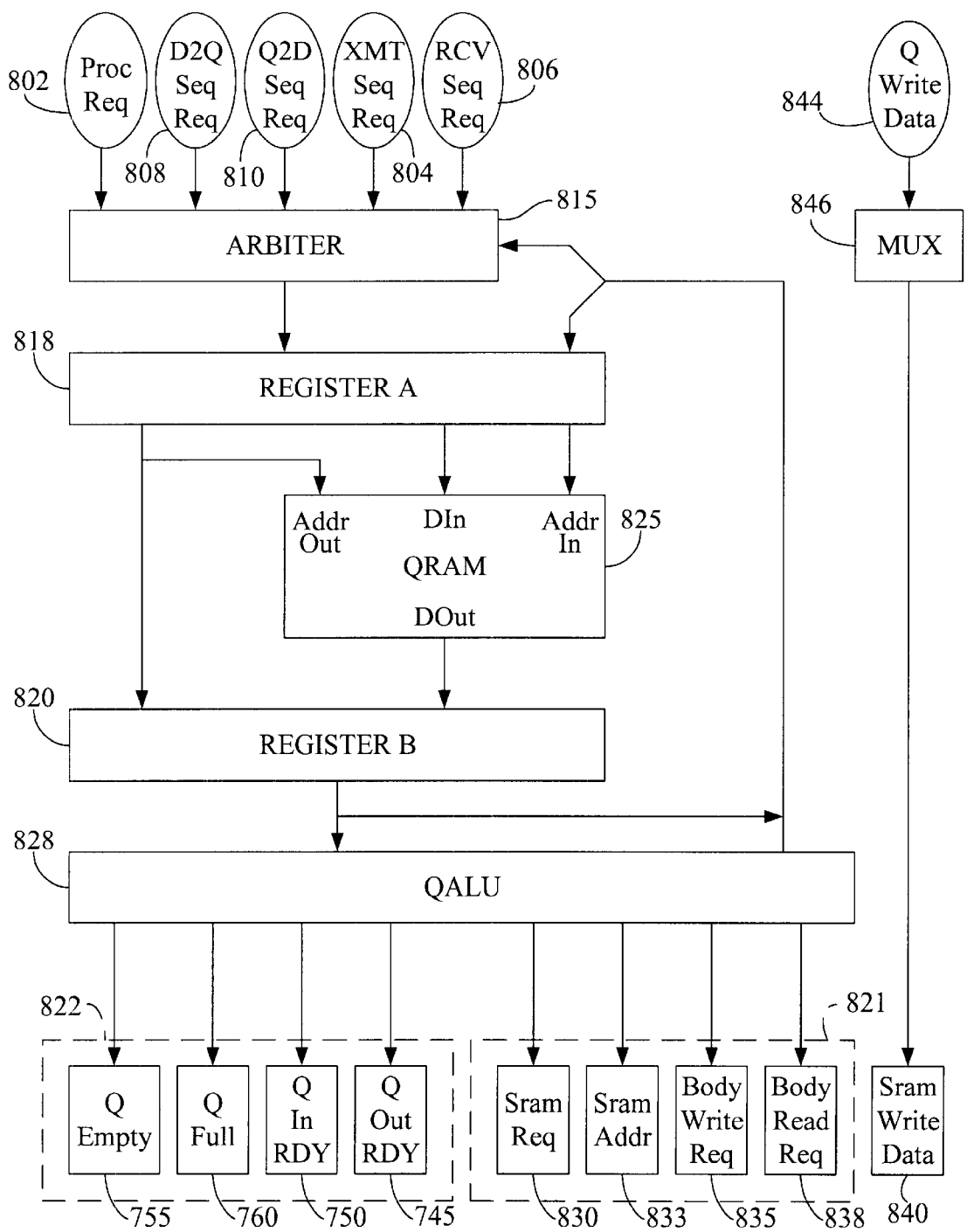
FIG. 18 is a diagram of a queue manager, which interacts with the queue storage units and status registers of FIG. 16 and FIG. 17.

Operation of the queue manager, which manages movement of queue entries between SRAM and the processor, the transmit and receive sequencers, and also between SRAM and DRAM, is shown in more detail in FIG. 18. Requests which utilize the queues include Processor Request 802, Transmit Sequencer Request 804, and Receive Sequencer Request 806. Other requests for the queues are DRAM to SRAM Request 808 and SRAM to DRAM Request 810, which operate on behalf of the queue manager in moving data back and forth between the DRAM and the SRAM head or tail of the queues. Determining which of these various requests will get to use the queue manager in the next cycle is handled by priority logic Arbiter 815. To enable high frequency operation the queue manager is pipelined, with Register A 818 and Register B 820 providing temporary storage, while Status Register 822 maintains status until the next update. The queue manager reserves even cycles for DMA, receive and transmit sequencer requests and odd cycles for processor requests. Dual ported QRAM 825 stores variables regarding each of the queues, the variables for each queue including a Head Write Pointer, Head Read Pointer, Tail Write Pointer and Tail Read Pointer corresponding to the queue's SRAM condition, and a Body Write Pointer and Body Read Pointer corresponding to the queue's DRAM condition and the queue's size.

After Arbiter 815 has selected the next operation to be performed, the variables of QRAM 825 are fetched and modified according to the selected operation by a QALU 828, and an SRAM Read Request 830 or an SRAM Write Request 840 may be generated. The variables are updated and the updated status is stored in Status Register 822 as well as QRAM 825. The status is also fed to Arbiter 815 to signal that the operation previously requested has been fulfilled, inhibiting duplication of requests. The Status Register 822 updates the four queue registers Q-Out_Ready 745, Q-In_Ready 750, Q-Empty 755 and Q-Full 760 to reflect the new status of the queue that was accessed. Similarly updated are SRAM Addresses 833, Body Write Request 835 and Body Read Requests 838, which are accessed via DMA to and from SRAM head and tails for that queue. Alternatively, various processes may wish to write to a queue, as shown by Q Write Data 844, which are selected by multiplexor 846, and pipelined to SRAM Write Request 840. The SRAM controller services the read and write requests by writing the tail or reading the head of the accessed queue and returning an acknowledge. In this manner the various queues are utilized and their status updated.

Figure 19A:
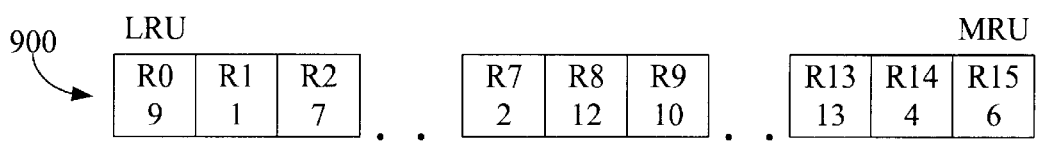
FIGS. 19A–D are diagrams of various stages of a least-recently-used register that is employed for allocating cache memory.
Figure 19B:
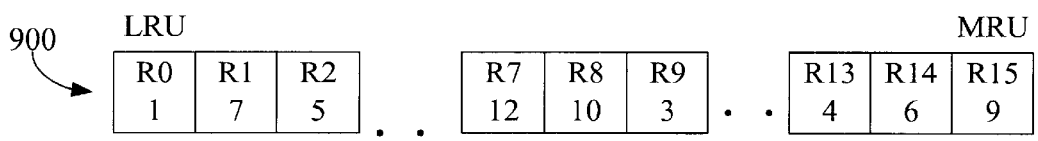
Figure 19C:
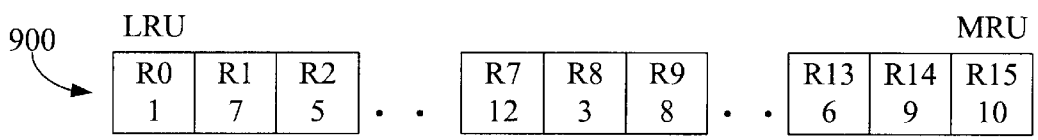

FIGS. 19A–C show a least-recently-used register 900 that is employed for choosing which contexts or CCBs to maintain in INIC cache memory. The INIC in this embodiment can cache up to sixteen CCBs in SRAM at a given time, and so when a new CCB is cached an old one must often be discarded, the discarded CCB usually chosen according to this register 900 to be the CCB that has been used least recently. In this embodiment, a hash table for up to two hundred fifty-six CCBs is also maintained in SRAM, while up to two hundred fifty-six full CCBs are held in DRAM. The least-recently-used register 900 contains sixteen four-bit blocks labeled R0–R15, each of which corresponds to an SRAM cache unit. Upon initialization, the blocks are numbered 0–15, with number 0 arbitrarily stored in the block representing the least recently used (LRU) cache unit and number 15 stored in the block representing the most recently used (MRU) cache unit. FIG. 19A shows the register 900 at an arbitrary time when the LRU block R0 holds the number 9 and the MRU block R15 holds the number 6.

When a different CCB than is currently being held in SRAM is to be cached, the LRU block R0 is read, which in FIG. 19A holds the number 9, and the new CCB is stored in the SRAM cache unit corresponding to number 9. Since the new CCB corresponding to number 9 is now the most recently used CCB, the number 9 is stored in the MRU block, as shown in FIG. 19B. The other numbers are all shifted one register block to the left, leaving the number 1 in the LRU block. The CCB that had previously been cached in the SRAM unit corresponding to number 9 has been moved to slower but more cost-effective DRAM.

FIG. 19C shows the result when the next CCB used had already been cached in SRAM. In this example, the CCB was cached in an SRAM unit corresponding to number 10, and so after employment of that CCB, number 10 is stored in the MRU block. Only those numbers which had previously been more recently used than number 10 (register blocks R9–R15) are shifted to the left, leaving the number 1 in the LRU block. In this manner the INIC maintains the most active CCBs in SRAM cache.

Figure 19D:
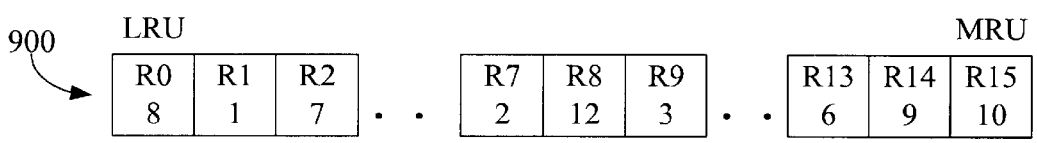

In some cases a CCB being used is one that is not desirable to hold in the limited cache memory. For example, it is preferable not to cache a CCB for a context that is known to be closing, so that other cached CCBs can remain in SRAM longer. In this case, the number representing the cache unit holding the decacheable CCB is stored in the LRU block R0 rather than the MRU block R15, so that the decacheable CCB will be replaced immediately upon employment of a new CCB that is cached in the SRAM unit corresponding to the number held in the LRU block R0. FIG. 19D shows the case for which number 8 (which had been in block R9 in FIG. 19C) corresponds to a CCB that will be used and then closed. In this case number 8 has been removed from block R9 and stored in the LRU block R0. All the numbers that had previously been stored to the left of block R9 (R1–R8) are then shifted one block to the right.

Figure 20:
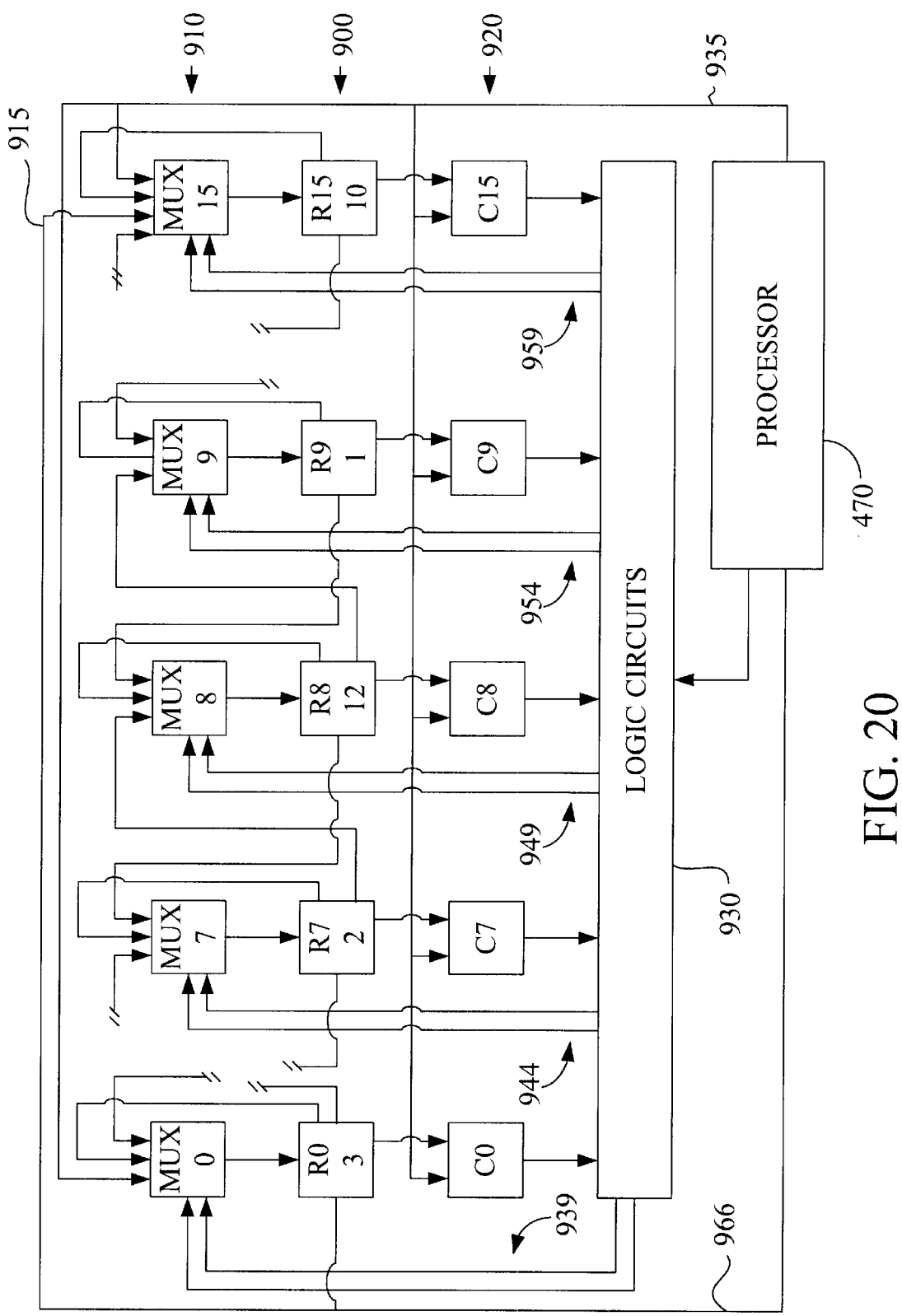
FIG. 20 is a diagram of the devices used to operate the least-recently-used register of FIGS. 19A–D.

FIG. 20 shows some of the logical units employed to operate the least-recently-used register 900. An array of sixteen, three or four input multiplexors 910, of which only multiplexors MUX0, MUX7, MUX8, MUX9 and MUX15 are shown for clarity, have outputs fed into the corresponding sixteen blocks of least-recently-used register 900. For example, the output of MUX0 is stored in block R0, the output of MUX7 is stored in block R7, etc. The value of each of the register blocks is connected to an input for its corresponding multiplexor and also into inputs for both adjacent multiplexors, for use in shifting the block numbers. For instance, the number stored in R8 is fed into inputs for MUX7, MUX8 and MUX9. MUX0 and MUX15 each have only one adjacent block, and the extra input for those multiplexors is used for the selection of LRU and MRU blocks, respectively. MUX15 is shown as a four-input multiplexor, with input 915 providing the number stored on R0.

An array of sixteen comparators 920 each receives the value stored in the corresponding block of the least-recently-used register 900. Each comparator also receives a signal from processor 470 along line 935 so that the register block having a number matching that sent by processor 470 outputs true to logic circuits 930 while the other fifteen comparators output false. Logic circuits 930 control a pair of select lines leading to each of the multiplexors, for selecting inputs to the multiplexors and therefore controlling shifting of the register block numbers. Thus select lines 939 control MUX0, select lines 944 control MUX7, select lines 949 control MUX8, select lines 954 control MUX9 and select lines 959 control MUX15.

When a CCB is to be used, processor 470 checks to see whether the CCB matches a CCB currently held in one of the sixteen cache units. If a match is found, the processor sends a signal along line 935 with the block number corresponding to that cache unit, for example number 12. Comparators 920 compare the signal from that line 935 with the block numbers and comparator C8 provides a true output for the block R8 that matches the signal, while all the other comparators output false. Logic circuits 930, under control from the processor 470, use select lines 959 to choose the input from line 935 for MUX15, storing the number 12 in the MRU block R15. Logic circuits 930 also send signals along the pairs of select lines for MUX8 and higher multiplexors, aside from MUX15, to shift their output one block to the left, by selecting as inputs to each multiplexor MUX8 and higher the value that had been stored in register blocks one block to the right (R9–R15). The outputs of multiplexors that are to the left of MUX8 are selected to be constant.

If processor 470 does not find a match for the CCB among the sixteen cache units, on the other hand, the processor reads from LRU block R0 along line 966 to identify the cache corresponding to the LRU block, and writes the data stored in that cache to DRAM. The number that was stored in R0, in this case number 3, is chosen by select lines 959 as input 915 to MUX15 for storage in MRU block R15. The other fifteen multiplexors output to their respective register blocks the numbers that had been stored each register block immediately to the right.

For the situation in which the processor wishes to remove a CCB from the cache after use, the LRU block R0 rather than the MRU block R15 is selected for placement of the number corresponding to the cache unit holding that CCB. The number corresponding to the CCB to be placed in the LRU block R0 for removal from SRAM (for example number 1, held in block R9) is sent by processor 470 along line 935, which is matched by comparator C9. The processor instructs logic circuits 930 to input the number 1 to R0, by selecting with lines 939 input 935 to MUX0. Select lines 954 to MUX9 choose as input the number held in register block R8, so that the number from R8 is stored in R9. The numbers held by the other register blocks between R0 and R9 are similarly shifted to the right, whereas the numbers in register blocks to the right of R9 are left constant. This frees scarce cache memory from maintaining closed CCBs for many cycles while their identifying numbers move through register blocks from the MRU to the LRU blocks.

Figure 21:
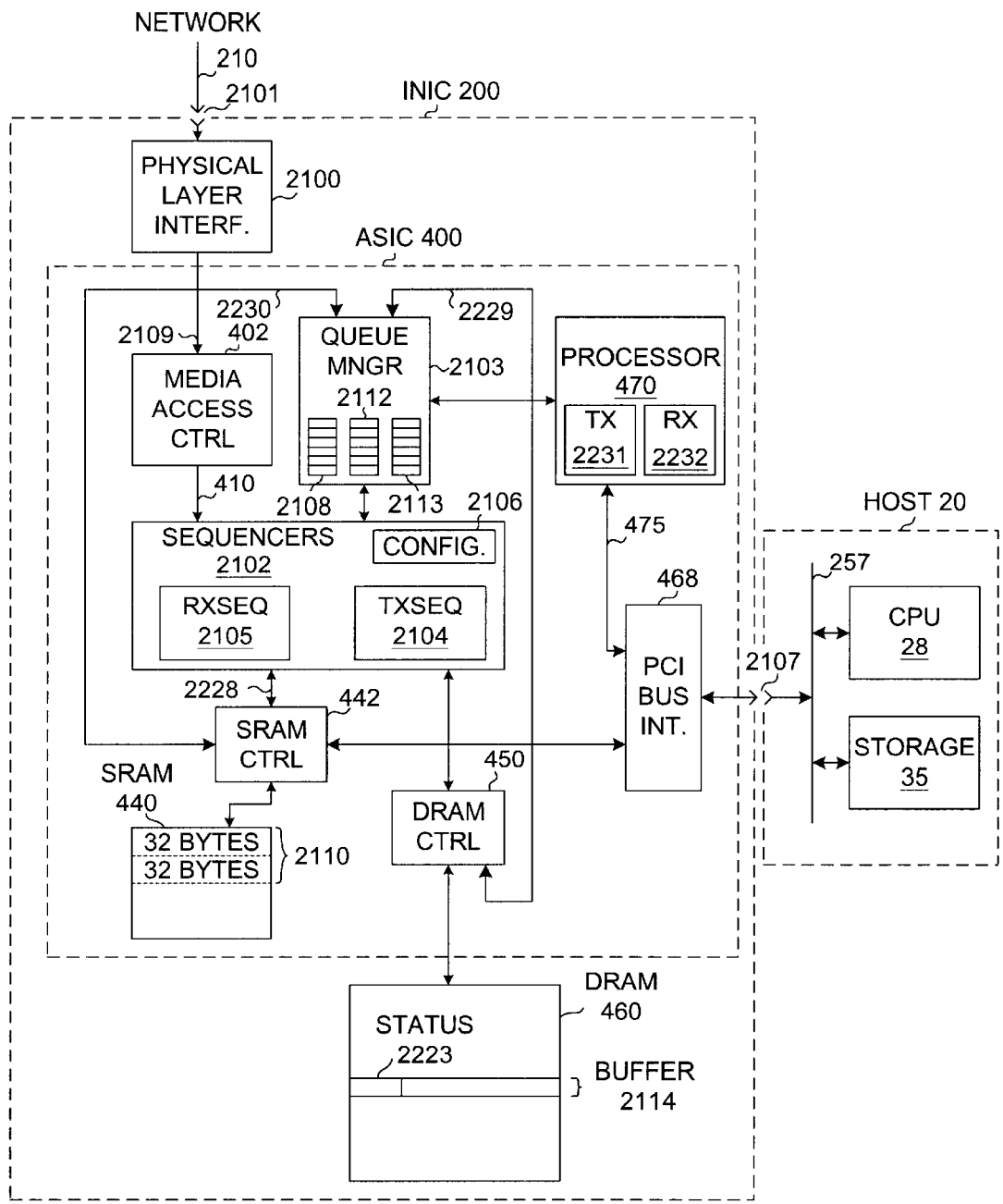
FIG. 21 is another diagram of Intelligent Network Interface Card (INIC) 200 of FIG. 13.

FIG. 21 is another diagram of Intelligent Network Interface Card (INIC) 200 of FIG. 13. INIC card 200 includes a Physical Layer Interface (PHY) chip 2100, ASIC chip 400 and Dynamic Random Access Memory (DRAM) 460. PHY chip 2100 couples INIC card 200 to network line 210 via a network connector 2101. INIC card 200 is coupled to the CPU of the host (for example, CPU 28 of host 20 of FIG. 1) via card edge connector 2107 and PCI bus 257. ASIC chip 400 includes a Media Access Control (MAC) unit 402, a sequencers block 2102, SRAM control 442, SRAM 440, DRAM control 450, a queue manager 2103, a processor 470, and a PCI bus interface unit 468. Structure and operation of queue manager 2103 is described above in connection with FIG. 18 and in U.S. patent application Ser. No. 09/416,925, entitled "Queue System For Microprocessors", filed Oct. 13, 1999, by Daryl D. Starr and Clive M. Philbrick (the subject matter of which is incorporated herein by reference). Sequencers block 2102 includes a transmit sequencer 2104, a receive sequencer 2105, and configuration registers 2106. A MAC destination address is stored in configuration register 2106. Part of the program code executed by processor 470 is contained in ROM (not shown) and part is located in a writeable control store SRAM (not shown). The program is downloaded into the writeable control store SRAM at initialization from the host 20.

Figure 22:
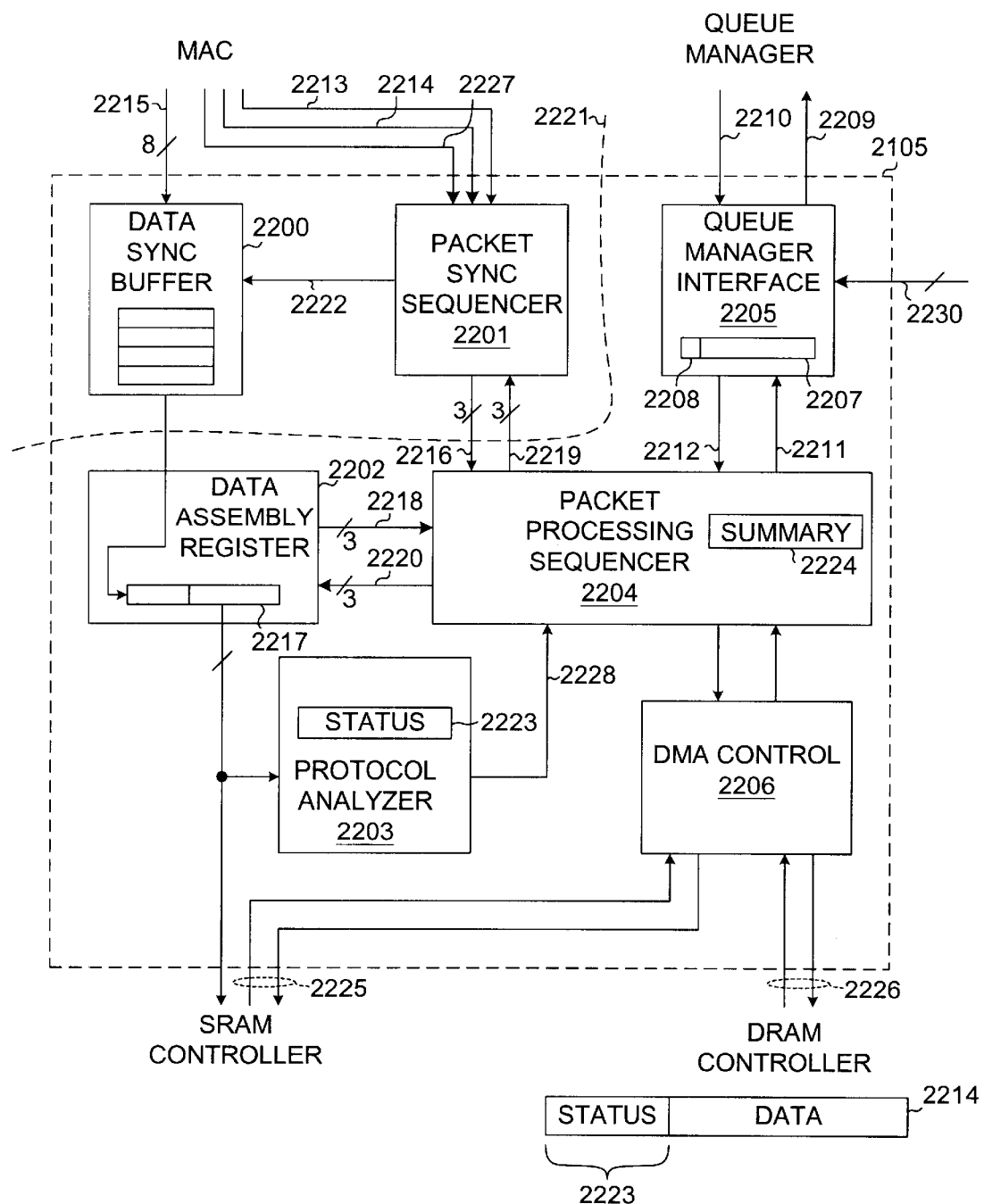
FIG. 22 is a diagram of the receive sequencer of FIG. 21.

FIG. 22 is a more detailed diagram of receive sequencer 2105. Receive sequencer 2105 includes a data synchronization buffer 2200, a packet synchronization sequencer 2201, a data assembly register 2202, a protocol analyzer 2203, a packet processing sequencer 2204, a queue manager interface 2205, and a Direct Memory Access (DMA) control block 2206. The packet synchronization sequencer 2201 and data synchronization buffer 2200 utilize a network-synchronized clock of MAC 402, whereas the remainder of the receive sequencer 2105 utilizes a fixed-frequency clock. Dashed line 2221 indicates the clock domain boundary.

Microfiche Appendix A contains a complete hardware description (verilog code) of an embodiment of receive sequencer 2105. Signals in the verilog code are named to designate their functions. Individual sections of the verilog code are identified and labeled with comment lines. Each of these sections describes hardware in a block of the receive sequencer 2105 as set forth below in Table 1.

TABLE 1

| SECTION OF VERILOG CODE | BLOCK OF FIG. 22 |
| --- | --- |
| Synchronization Interface | 2201 |
| Sync-Buffer Read-Ptr Synchronizers | 2201 |
| Packet-Synchronization Sequencer | 2201 |
| Data Synchronization Buffer | 2201 and 2200 |
| Synchronized Status for Link-Destination-Address | 2201 |
| Synchronizaed Status-Vector | 2201 |
| Synchronization Interface | 2204 |
| Receive Packet Control and Status | 2204 |
| Buffer-Descriptor | 2201 |
| Ending Packet Status | 2201 |
| AssyReg shift-in. Mac −> AssyReg. | 2202 and 2204 |
| Fifo shift-in. AssyReg −> Sram Fifo | 2206 |
| Fifo ShiftOut Burst. SramFifo −> DramBuffer | 2206 |
| Fly-By Protocol Analyzer; Frame, Network and Transport Layers | 2203 |
| Link Pointer | 2203 |
| Mac address detection | 2203 |
| Magic pattern detection | 2203 |
| Link layer and network layer detection | 2203 |
| Network counter | 2203 |
| Control Packet analysis | 2203 |
| Network header analysis | 2203 |
| Transport layer counter | 2203 |
| Transport header analysis | 2203 |
| Pseudo-header stuff | 2203 |
| Free-Descriptor Fetch | 2205 |
| Receive-Descriptor Store | 2205 |
| Receive-Vector Store | 2205 |
| Queue-manager interface-mux | 2205 |
| Pause Clock Generator | 2201 |
| Pause Timer | 2204 |

Operation of receive sequencer 2105 of FIGS. 21 and 22 is now described in connection with the receipt onto INIC card 200 of a TCP/IP packet from network line 210. At initialization time, processor 470 partitions DRAM 460 into buffers. Receive sequencer 2105 uses the buffers in DRAM 460 to store incoming network packet data as well as status information for the packet. Processor 470 creates a 32-bit buffer descriptor for each buffer. A buffer descriptor indicates the size and location in DRAM of its associated buffer. Processor 470 places these buffer descriptors on a "free-buffer queue" 2108 by writing the descriptors to the queue manager 2103. Queue manager 2103 maintains multiple queues including the "free-buffer queue" 2108. In this implementation, the heads and tails of the various queues are located in SRAM 440, whereas the middle portion of the queues are located in DRAM 460.

Lines 2229 comprise a request mechanism involving a request line and address lines. Similarly, lines 2230 comprise a request mechanism involving a request line and address lines. Queue manager 2103 uses lines 2229 and 2230 to issue requests to transfer queue information from DRAM to SRAM or from SRAM to DRAM.

The queue manager interface 2205 of the receive sequencer always attempts to maintain a free buffer descriptor 2207 for use by the packet processing sequencer 2204. Bit 2208 is a ready bit that indicates that free-buffer descriptor 2207 is available for use by the packet processing sequencer 2204. If queue manager interface 2205 does not have a free buffer descriptor (bit 2208 is not set), then queue manager interface 2205 requests one from queue manager 2103 via request line 2209. (Request line 2209 is actually a bus which communicates the request, a queue ID, a read/write signal and data if the operation is a write to the queue.) In response, queue manager 2103 retrieves a free buffer descriptor from the tail of the "free buffer queue" 2108 and then alerts the queue manager interface 2205 via an acknowledge signal on acknowledge line 2210. When queue manager interface 2205 receives the acknowledge signal, the queue manager interface 2205 loads the free buffer descriptor 2207 and sets the ready bit 2208. Because the free buffer descriptor was in the tail of the free buffer queue in SRAM 440, the queue manager interface 2205 actually receives the free buffer descriptor 2207 from the read data bus 2228 of the SRAM control block 442. Packet processing sequencer 2204 requests a free buffer descriptor 2207 via request line 2211. When the queue manager interface 2205 retrieves the free buffer descriptor 2207 and the free buffer descriptor 2207 is available for use by the packet processing sequencer, the queue manager interface 2205 informs the packet processing sequencer 2204 via grant line 2212. By this process, a free buffer descriptor is made available for use by the packet processing sequencer 2204 and the receive sequencer 2105 is ready to processes an incoming packet.

Next, a TCP/IP packet is received from the network line 210 via network connector 2101 and Physical Layer Interface (PHY) 2100. PHY 2100 supplies the packet to MAC 402 via a Media Independent Interface (MII) parallel bus 2109. MAC 402 begins processing the packet and asserts a "start of packet" signal on line 2213 indicating that the beginning of a packet is being received. When a byte of data is received in the MAC and is available at the MAC outputs 2215, MAC 402 asserts a "data valid" signal on line 2214. Upon receiving the "data valid" signal, the packet synchronization sequencer 2201 instructs the data synchronization buffer 2200 via load signal line 2222 to load the received byte from data lines 2215. Data synchronization buffer 2200 is four bytes deep. The packet synchronization sequencer 2201 then increments a data synchronization buffer write pointer. This data synchronization buffer write pointer is made available to the packet processing sequencer 2204 via lines 2216. Consecutive bytes of data from data lines 2215 are clocked into the data synchronization buffer 2200 in this way.

A data synchronization buffer read pointer available on lines 2219 is maintained by the packet processing sequencer 2204. The packet processing sequencer 2204 determines that data is available in data synchronization buffer 2200 by comparing the data synchronization buffer write pointer on lines 2216 with the data synchronization buffer read pointer on lines 2219.

Data assembly register 2202 contains a sixteen-byte long shift register 2217. This register 2217 is loaded serially a single byte at a time and is unloaded in parallel. When data is loaded into register 2217, a write pointer is incremented. This write pointer is made available to the packet processing sequencer 2204 via lines 2218. Similarly, when data is unloaded from register 2217, a read pointer maintained by packet processing sequencer 2204 is incremented. This read pointer is available to the data assembly register 2202 via lines 2220. The packet processing sequencer 2204 can therefore determine whether room is available in register 2217 by comparing the write pointer on lines 2218 to the read pointer on lines 2220.

If the packet processing sequencer 2204 determines that room is available in register 2217, then packet processing sequencer 2204 instructs data assembly register 2202 to load a byte of data from data synchronization buffer 2200. The data assembly register 2202 increments the data assembly register write pointer on lines 2218 and the packet processing sequencer 2204 increments the data synchronization buffer read pointer on lines 2219. Data shifted into register 2217 is examined at the register outputs by protocol analyzer 2203 which verifies checksums, and generates "status" information 2223.

DMA control block 2206 is responsible for moving information from register 2217 to buffer 2114 via a sixty-four byte receive FIFO 2110. DMA control block 2206 implements receive FIFO 2110 as two thirty-two byte ping-pong buffers using sixty-four bytes of SRAM 440. DMA control block 2206 implements the receive FIFO using a write-pointer and a read-pointer. When data to be transferred is available in register 2217 and space is available in FIFO 2110, DMA control block 2206 asserts an SRAM write request to SRAM controller 442 via lines 2225. SRAM controller 442 in turn moves data from register 2217 to FIFO 2110 and asserts an acknowledge signal back to DMA control block 2206 via lines 2225. DMA control block 2206 then increments the receive FIFO write pointer and causes the data assembly register read pointer to be incremented.

When thirty-two bytes of data has been deposited into receive FIFO 2110, DMA control block 2206 presents a DRAM write request to DRAM controller 450 via lines 2226. This write request consists of the free buffer descriptor 2207 ORed with a "buffer load count" for the DRAM request address, and the receive FIFO read pointer for the SRAM read address. Using the receive FIFO read pointer, the DRAM controller 450 asserts a read request to SRAM controller 442. SRAM controller 442 responds to DRAM controller 450 by returning the indicated data from the receive FIFO 2110 in SRAM 440 and asserting an acknowledge signal. DRAM controller 450 stores the data in a DRAM write data register, stores a DRAM request address in a DRAM address register, and asserts an acknowledge to DMA control block 2206. The DMA control block 2206 then decrements the receive FIFO read pointer. Then the DRAM controller 450 moves the data from the DRAM write data register to buffer 2114. In this way, as consecutive thirty-two byte chunks of data are stored in SRAM 440, DRAM control block 2206 moves those thirty-two byte chunks of data one at a time from SRAM 440 to buffer 2214 in DRAM 460. Transferring thirty-two byte chunks of data to the DRAM 460 in this fashion allows data to be written into the DRAM using the relatively efficient burst mode of the DRAM.

Packet data continues to flow from network line 210 to buffer 2114 until all packet data has been received. MAC 402 then indicates that the incoming packet has completed by asserting an "end of frame" (i.e., end of packet) signal on line 2227 and by presenting final packet status (MAC packet status) to packet synchronization sequencer 2204. The packet processing sequencer 2204 then moves the status 2223 (also called "protocol analyzer status") and the MAC packet status to register 2217 for eventual transfer to buffer 2114. After all the data of the packet has been placed in buffer 2214, status 2223 and the MAC packet status is transferred to buffer 2214 so that it is stored prepended to the associated data as shown in FIG. 22.

After all data and status has been transferred to buffer 2114, packet processing sequencer 2204 creates a summary 2224 (also called a "receive packet descriptor") by concatenating the free buffer descriptor 2207, the buffer loadcount, the MAC ID, and a status bit (also called an "attention bit"). If the attention bit is a one, then the packet is not a "fast-path candidate"; whereas if the attention bit is a zero, then the packet is a "fast-path candidate". The value of the attention bit represents the result of a significant amount of processing that processor 470 would otherwise have to do to determine whether the packet is a "fast-path candidate". For example, the attention bit being a zero indicates that the packet employs both TCP protocol and IP protocol. By carrying out this significant amount of processing in hardware beforehand and then encoding the result in the attention bit, subsequent decision making by processor 470 as to whether the packet is an actual "fast-path packet" is accelerated. A complete logical description of the attention bit in verilog code is set forth on page 9 of the Microfiche Appendix A in the lines following the heading "Ending Packet Status".

Packet processing sequencer 2204 then sets a ready bit (not shown) associated with summary 2224 and presents summary 2224 to queue manager interface 2205. Queue manager interface 2205 then requests a write to the head of a "summary queue" 2112 (also called the "receive descriptor queue"). The queue manager 2103 receives the request, writes the summary 2224 to the head of the summary queue 2212, and asserts an acknowledge signal back to queue manager interface via line 2210. When queue manager interface 2205 receives the acknowledge, queue manager interface 2205 informs packet processing sequencer 2204 that the summary 2224 is in summary queue 2212 by clearing the ready bit associated with the summary. Packet processing sequencer 2204 also generates additional status information (also called a "vector") for the packet by concatenating the MAC packet status and the MAC ID. Packet processing sequencer 2204 sets a ready bit (not shown) associated with this vector and presents this vector to the queue manager interface 2205. The queue manager interface 2205 and the queue manager 2103 then cooperate to write this vector to the head of a "vector queue" 2113 in similar fashion to the way summary 2224 was written to the head of summary queue 2112 as described above. When the vector for the packet has been written to vector queue 2113, queue manager interface 2205 resets the ready bit associated with the vector.

Once summary 2224 (including a buffer descriptor that points to buffer 2114) has been placed in summary queue 2112 and the packet data has been placed in buffer 2144, processor 470 can retrieve summary 2224 from summary queue 2112 and examine the "attention bit".

If the attention bit from summary 2224 is a digital one, then processor 470 determines that the packet is not a "fast-path candidate" and processor 470 need not examine the packet headers. Only the status 2223 (first sixteen bytes) from buffer 2114 are DMA transferred to SRAM so processor 470 can examine it. If the status 2223 indicates that the packet is a type of packet that is not to be transferred to the host (for example, a multicast frame that the host is not registered to receive), then the packet is discarded (i.e., not passed to the host). If status 2223 does not indicate that the packet is the type of packet that is not to be transferred to the host, then the entire packet (headers and data) is passed to a buffer on host 20 for "slow-path" transport and network layer processing by the protocol stack of host 20.

If, on the other hand, the attention bit is a zero, then processor 470 determines that the packet is a "fast-path candidate". If processor 470 determines that the packet is a "fast-path candidate", then processor 470 uses the buffer descriptor from the summary to DMA transfer the first approximately 96 bytes of information from buffer 2114 from DRAM 460 into a portion of SRAM 440 so processor 470 can examine it. This first approximately 96 bytes contains status 2223 as well as the IP source address of the IP header, the IP destination address of the IP header, the TCP source address of the TCP header, and the TCP destination address of the TCP header. The IP source address of the IP header, the IP destination address of the IP header, t he TCP source address of the TCP header, and the TCP destination address of the TCP header together uniquely define a single connection context (TCB) with which the packet is associated. Processor 470 examines these addresses of the TCP and IP headers and determines the connection context of the packet. Processor 470 then checks a list of connection contexts that are under the control on IMC card 200 and determines whether the packet is associated with a connection context (TCB) under the control of INIC card 200.

If the connection context is not in the list, then the "fast-path candidate" packet is determined not to be a "fast-path packet." In such a case, the entire packet (headers and data) is transferred to a buffer in host 20 for "slow-path" processing by the protocol stack of host 20. If, on the other hand, the connection context is in the list, then software executed by processor 470 including software state machines 2231 and 2232 checks for one of numerous exception conditions and determines whether the packet is a "fast-path packet" or is not a "fast-path packet". These exception conditions include: 1) IP fragmentation is detected; 2) an IP option is detected; 3) an unexpected TCP flag (urgent bit set, reset bit set, SYN bit set or FIN bit set) is detected; 4) the ACK field in the TCP header is before the TCP window, or the ACK field in the TCP header is after the TCP window, or the ACK field in the TCP header shrinks the TCP window; 5) the ACK field in the TCP header is a duplicate ACK and the ACK field exceeds the duplicate ACK count (the duplicate ACK count is a user settable value); and 6) the sequence number of the TCP header is out of order (packet is received out of sequence). If the software executed by processor 470 detects one of these exception conditions, then processor 470 determines that the "fast-path candidate" is not a "fast-path packet." In such a case, the connection context for the packet is "flushed" (the connection context is passed back to the host) so that the connection context is no longer present in the list of connection contexts under control of INIC card 200. The entire packet (headers and data) is transferred to a buffer in host 20 for "slow-path" transport layer and network layer processing by the protocol stack of host 20.

If, on the other hand, processor 470 finds no such exception condition, then the "fast-path candidate" packet is determined to be an actual "fast-path packet". The receive state machine 2232 then processes of the packet through TCP. The data portion of the packet in buffer 2114 is then transferred by another DMA controller (not shown in FIG. 21) from buffer 2114 to a host-allocated file cache in storage 35 of host 20. In one embodiment, host 20 does no analysis of the TCP and IP headers of a "fast-path packet". All analysis of the TCP and IP headers of a "fast-path packet" is done on INIC card 20.

Figure 23:
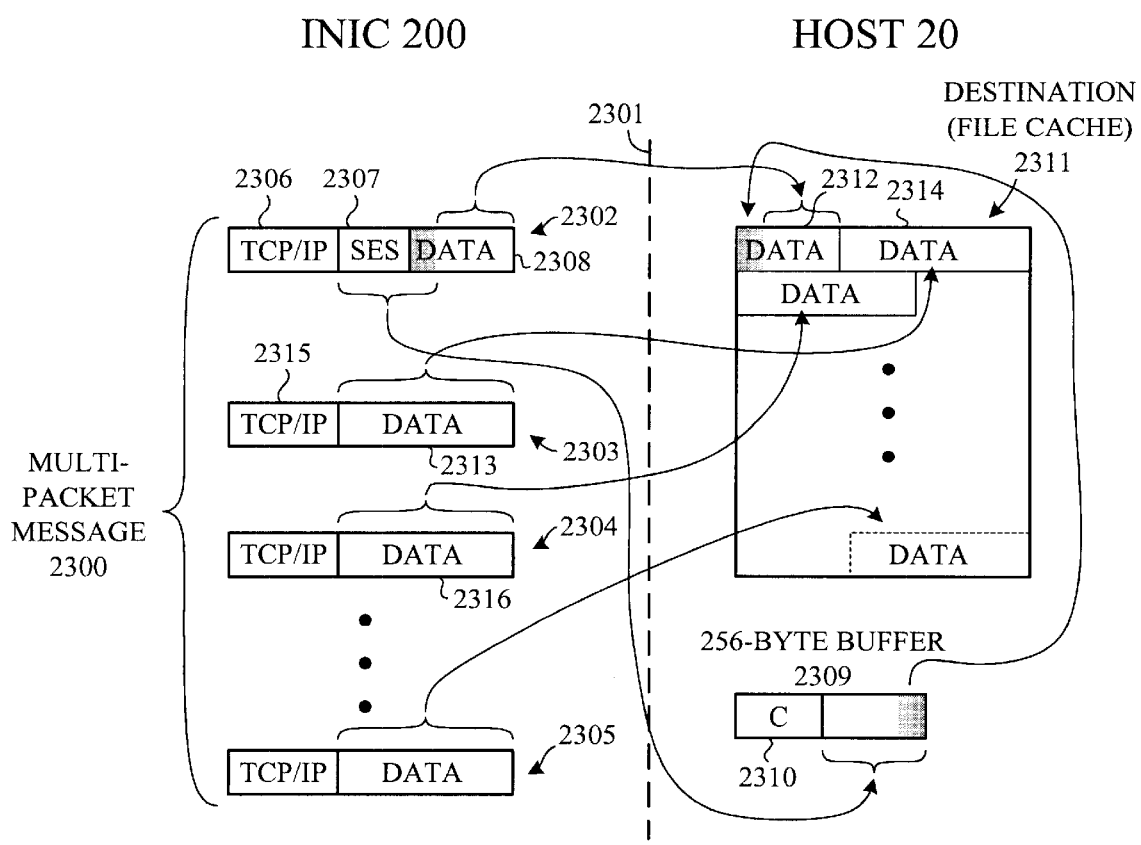
FIG. 23 is a diagram illustrating a "fast-path" transfer of data of a multi-packet message from INIC 200 to a destination 2311 in host 20.

FIG. 23 is a diagram illustrating the transfer of data of "fast-path packets" (packets of a 64k-byte session layer message 2300) from INIC 200 to host 20. The portion of the diagram to the left of the dashed line 2301 represents INIC 200, whereas the portion of the diagram to the right of the dashed line 2301 represents host 20. The 64k-byte session layer message 2300 includes approximately forty-five packets, four of which (2302, 2303, 2304 and 2305) are labeled on FIG. 23. The first packet 2302 includes a portion 2306 containing transport and network layer headers (for example, TCP and IP headers), a portion 2307 containing a session layer header, and a portion 2308 containing data. In a first step, portion 2307, the first few bytes of data from portion 2308, and the connection context identifier 2310 of the message 2300 are transferred from INIC 200 to a 256-byte buffer 2309 in host 20. In a second step; host 20 examines this information and returns to INIC 200 a destination (for example, the location of a file cache 2311 in storage 35) for the data. Host 20 also copies the first few bytes of the data from buffer 2309 to the beginning of a first part 2312 of file cache 2311. In a third step, INIC 200 transfers the remainder of the data from portion 2308 to host 20 such that the remainder of the data is stored in the remainder of first part 2312 of file cache 2311. No network, transport, or session layer headers are stored in first part 2312 of file cache 2311. Next, the data portion 2313 of the second packet 2303 is transferred to host 20 such that the data portion 2313 of the second packet 2303 is stored in a second part 2314 of file cache 2311. The transport layer and network layer header portion 2315 of second packet 2303 is not transferred to host 20. There is no network, transport, or session layer header stored in file cache 2311 between the data portion of first packet 2302 and the data portion of second packet 2303. Similarly, the data portion 2316 of the next packet 2304 of the session layer message is transferred to file cache 2311 so that there is no network, transport, or session layer headers between the data portion of the second packet 2303 and the data portion of the third packet 2304 in file cache 2311. In this way, only the data portions of the packets of the session layer message are placed in the file cache 2311. The data from the session layer message 2300 is present in file cache 2311 as a block such that this block contains no network, transport, or session layer headers.

In the case of a shorter, single-packet session layer message, portions 2307 and 2308 of the session layer message are transferred to 256-byte buffer 2309 of host 20 along with the connection context identifier 2310 as in the case of the longer session layer message described above. In the case of a single-packet session layer message, however, the transfer is completed at this point. Host 20 does not return a destination to INIC 200 and INIC 200 does not transfer subsequent data to such a destination.

Microfiche Appendix B includes a listing of software executed by processor 470 that determines whether a "fast-path candidate" packet is or is not a "fast-path packet". Microfiche Appendix B also includes a description of the instruction set of processor 470. Another example of the instruction set of processor 470 is found starting on page 79 of the Provisional U.S. Patent Application Serial No. 60/061,809, entitled "Intelligent Network Interface Card And System For Protocol Processing", filed Oct. 14, 1997 (the subject matter of this provisional application is incorporated herein by reference).

Microfiche Appendix C includes device driver software executable on host 20 that interfaces the host 20 to INIC card 200. There is also ATCP code that executes on host 20. This ATCP code includes: 1) a "free BSD" stack (available from the University of California, Berkeley) that has been modified slightly to make it run on the NT4 operating system (the "free BSD" stack normally runs on a UNIX machine), and 2) code added to the free BSD stack between the session layer above and the device driver below that enables the BSD stack to carry out "fast-path" processing in conjunction with INIC 200. Microfiche Appendix C includes the code added to the BSD stack.

All told, the above-described devices and systems for processing of data communication result in dramatic reductions in the time and host resources required for processing large, connection-based messages. Protocol processing speed and efficiency is tremendously accelerated by specially designed protocol processing hardware as compared with a general purpose CPU running conventional protocol software, and interrupts to the host CPU are also substantially reduced. These advantages can be provided to an existing host by addition of an intelligent network interface card (INIC), or the protocol processing hardware may be integrated with the CPU. In either case, the protocol processing hardware and CPU intelligently decide which device processes a given message, and can change the allocation of that processing based upon conditions of the message.

What is claimed is:

1. A device for communication between a network and a host computer, the device being coupled to the network and being coupled to the host computer, the host computer having a protocol stack, the device comprising:
   a receive sequencer that analyzes headers of packets received onto the device from the network, the receive sequencer generating for each of the packets an associated summary, each of the summaries being indicative of whether the associated packet is a fast-path candidate;
   a memory that stores the summaries; and
   a processor that obtains the summaries from the memory and determines, for each summary indicating that the associated packet is a fast-path candidate, whether the associated packet meets a plurality of fast-path criteria, and wherein if the processor determines that a packet meets the plurality of fast-path criteria then the processor performs transport and network layer processing of the packet on the device such that the protocol stack of the host computer does not perform the transport or network layer processing of the packet, whereas if the processor determines that the packet does not meet the plurality of fast-path criteria then the processor does not perform the transport and network layer processing such that the transport and network layer processing is done by the protocol stack of the host computer.

2. The device of claim 1, wherein only packets utilizing a particular transport layer protocol and a particular network layer protocol can be fast-path candidates, and wherein each packet received onto the host utilizes a transport layer protocol and a network layer protocol, the summary of a packet being indicative of whether the transport layer protocol utilized by the packet is the particular transport layer protocol, the summary of the packet also being indicative of whether the network layer protocol utilized by the packet is the particular network layer protocol.

3. The device of claim 1, wherein a plurality of connection contexts is maintained on the device, and wherein the determination by the processor that the packet meets the plurality of fast-path criteria involves determining that a connection context associated with the packet is one of the plurality of connection contexts maintained on the device.

4. The device of claim 1, wherein a message comprising a plurality of packets is received onto the device, each of the packets of the message having a header portion and a data portion, the receive sequencer generating for each of the packets of the message a summary indicating that the packet is a fast-path candidate, the processor determining that each of the packets of the message meets the plurality of fast-path criteria, the data portions of the packets of the message being transferred to the host computer and stored as a block of data.

5. The device of claim 4, wherein the block of data contains no transport layer headers and contains no network layer headers.

6. The device of claim 4, wherein the processor does not attempt to determine whether a particular packet meets the plurality of fast-path criteria if the summary for the particular packet indicates that the particular packet is not a fast-path candidate.

7. A device for communication between a network and a host computer, the device being coupled to the network and being coupled to the host computer, the host computer having a protocol stack, the device comprising:
   a receive sequencer that analyzes headers of packets received onto the device from the network, the receive sequencer generating for each of the packets an associated summary;
   a memory that stores the summaries; and
   a mechanism that obtains the summaries from the memory and determines, for each summary, whether: 1) the packet associated with the summary is processed by the protocol stack of the host, or 2) data contained in the packet is delivered to a destination in the host without protocol processing by the host.

8. The device of claim 7, wherein the summary contains an attention bit indicative of whether the associated packet is a candidate for being delivered to the destination in the host without protocol processing by the host.

9. The device of claim 8, wherein the associated packet has a transport layer protocol and a network layer protocol, the packet not being a candidate for being delivered to the destination in the host without protocol processing by the host: 1) if the transport layer protocol of the packet is not a predetermined transport layer protocol, and 2) if the network layer protocol of the packet is not a predetermined network layer protocol.

10. The device of claim 7, wherein the mechanism contains a processor that checks the packet for an exception condition prior to the packet being delivered to the destination in the host without protocol processing by the host.

11. The device of claim 7, wherein a session layer message comprises a first packet and a second packet, each of the first and second packets comprising a header and data, the destination in the host being a portion of memory, and wherein the mechanism delivers the data of the first packet and the data of the second packet to the destination such that the data from the first packet and the data of the second packet are stored in the destination without any header being stored between the data of the first packet and the data of the second packet.

12. The device of claim 11, wherein the first packet is a transport layer packet and wherein the second packet is a transport layer packet, there being no transport layer header stored in the destination between the data of the first packet and the data of the second packet, there being no network layer header stored in the destination between the data of the first packet and the data of the second packet.

13. The device of claim 7, wherein the packet associated with the summary has an associated context, the mechanism determining whether the associated context is one of a plurality of contexts, wherein if the associated context is not one of the plurality of contexts then the packet associated with the summary is processed by the protocol stack of the host.

14. The device of claim 7, wherein each packet received onto the device has one and only one associated context, and wherein the destination is associated with one and only one context, wherein only data of packets having a particular context are stored in the destination associated with that particular context.

15. A system for communicating a TCP data packet through a network from a first computer to a second computer, the TCP data packet being communicated from the first computer to the second computer via a TCP/IP connection, the system comprising:

a device coupled to the network, the device comprising a first portion and a second portion, the first portion performing initial TCP processing on the TCP data packet as the TCP data packet is received onto the device from the network, the second portion being a processor that performs subsequent TCP processing on the TCP data packet; and a protocol processing stack disposed in the second computer and configured for passing control of the TCP/IP connection to the device, the control being passed from the protocol processing stack to the device, the TCP data packet being generally processed by the device instead of the protocol processing stack when the device is controlling the TCP/IP connection.

16. The system of claim 15, wherein the device is a communication processing device (CPD) integrated into the second computer.

17. The system of claim 15, wherein the device is an intelligent network interface card (INIC) that is added to the second computer.

18. The system of claim 15, wherein the first portion performs TCP checksum validation.

19. The system of claim 15, wherein the first portion sets a bit to indicate that the TCP data packet is a fast-path candidate, the bit being read by the second portion.

20. The system of claim 15, wherein the device performs substantially all TCP protocol receive processing on the TCP data packet and the protocol processing stack performs substantially no TCP protocol receive processing on the TCP data packet.

* * * * *